US010565605B2

(12) United States Patent
Yoon

(10) Patent No.: US 10,565,605 B2
(45) Date of Patent: Feb. 18, 2020

(54) APPARATUS AND METHOD TO BUILD POWER STATION OF RESIDENT WITH FINTECH PLATFORM MODULE

(71) Applicant: NEMO PARTNERS NEC, Seoul (KR)

(72) Inventor: Suk-ho Yoon, Seoul (KR)

(73) Assignee: NEMO PARTNERS NEC, Seoul (KR)

( * ) Notice: Subject to any disclaimer, the term of this patent is extended or adjusted under 35 U.S.C. 154(b) by 289 days.

(21) Appl. No.: 15/792,885

(22) Filed: Oct. 25, 2017

(65) Prior Publication Data

US 2019/0122239 A1    Apr. 25, 2019

(51) Int. Cl.
*G06Q 20/32* (2012.01)
*G06Q 30/02* (2012.01)

(52) U.S. Cl.
CPC ..... *G06Q 30/0206* (2013.01); *G06Q 30/0201* (2013.01); *G06Q 30/0252* (2013.01); *G06Q 30/0261* (2013.01); *G06Q 30/0283* (2013.01); *Y02E 10/50* (2013.01); *Y02E 10/70* (2013.01); *Y04S 50/10* (2013.01)

(58) Field of Classification Search
USPC ............................................. 703/1; 705/412
See application file for complete search history.

(56) References Cited

U.S. PATENT DOCUMENTS

| 2008/0091625 | A1* | 4/2008 | Kremen | ................. G01D 4/004 705/412 |
| 2012/0046917 | A1* | 2/2012 | Fang | ....................... G01W 1/10 703/1 |
| 2018/0137498 | A1* | 5/2018 | Kim | ..................... G06Q 20/204 |
| 2018/0293656 | A1* | 10/2018 | Yeh | ........................ G06N 5/022 |

FOREIGN PATENT DOCUMENTS

KR    10-2009-0002295 A    1/2009

* cited by examiner

*Primary Examiner* — Afaf Osman Bilal Ahmed
(74) *Attorney, Agent, or Firm* — Novick, Kim & Lee, PLLC; Jae Youn Kim

(57) ABSTRACT

Provided is an apparatus including a new and renewable energy FinTech platform module, a new and renewable energy power generator, a new and renewable energy generated power-to-cash change control unit, a cloud computing module, and a smart economic feasibility analysis simulation module and method for encouraging participation of residents in building a new and renewable energy farm through notification of economic feasibility analysis with a new and renewable energy FinTech platform module that can guide the residents in an area where a new and renewable energy power generator is installed to jointly purchase a new and renewable energy power generator that is installed and operated in advance, set unique IDs for the residents having purchased the new and renewable energy power generator, and share the amount of daily produced electricity generated from the new and renewable energy power generator, cash exchange data, and 1:1 revenue dividends.

11 Claims, 21 Drawing Sheets

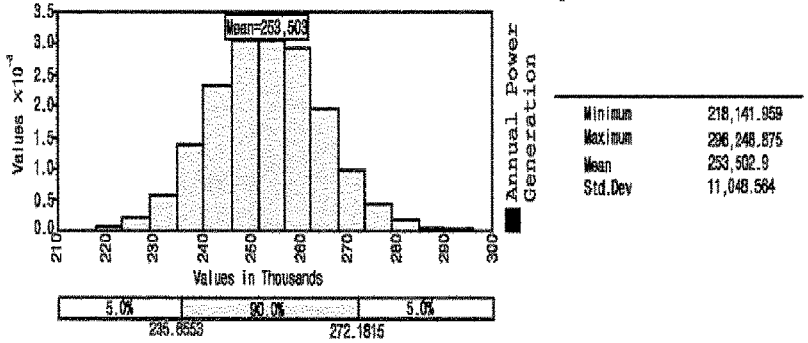
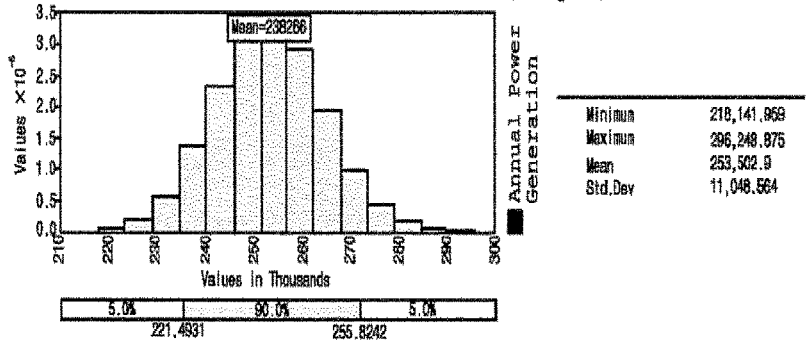
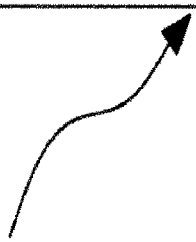
FIG. 18

Retrieve reference information data necessary for estimation of the cost of new and renewable energy stored in the cloud computing module, estimate the cost of the new and renewable energy power generation equipment, analyze the economic feasibility of the new and renewable energy business model including the expected profit of the new and renewable energy power generation equipment, and transmit the analyzed new and renewable energy business model economic feasibility analysis data to the data transfer unit through the new and renewable energy business model economic feasibility analysis simulation module ~S510

Transmit the data of the analyzed feasibility analysis of the new and renewable energy business model received from the new and renewable energy business model economic feasibility analysis simulation module to the new and renewable energy FinTech platform module through the data transfer unit ~S520

FIG. 28

APPARATUS AND METHOD TO BUILD POWER STATION OF RESIDENT WITH FINTECH PLATFORM MODULE

BACKGROUND OF THE INVENTION

Field of the Invention

The present invention relates to an apparatus and method for encouraging participation of residents in building a new and renewable energy farm through notification of economic feasibility analysis with a new and renewable energy FinTech platform module that can advertise to the residents in an area where new and renewable energy power generators are installed, guide the residents to jointly purchase a new and renewable energy power generator that is installed and operated in advance, set unique IDs for the residents having purchased the new and renewable energy power generator, allow the daily amount of electricity generated from the new and renewable energy power generator, cash exchange data, and the profit through 1:1 revenue dividends to be shared by the residents, and notify the residents of the result of analysis of economic feasibility of the new and renewable energy business model in real time, thereby elevating awareness that new and renewable energy is turned into money and economical, and improving the participation rate of the residents in building a new and renewable energy farm.

Description of the Related Art

Currently, new and renewable energy is energy such as solar energy, geothermal energy, ocean energy, wind energy, and bio energy which are obtained by converting existing fossil fuels or converting energy that can be renewed.

Since these energies are renewable unlike fossil fuels, they cannot be depleted. In addition, they are environmentally friendly because they produce less pollutants and carbon dioxide emissions. Further, they are relatively uniformly distributed on the earth compared to fossil fuels. However, building a power station is greatly affected by the natural environment, takes a high investment cost at the beginning of development and is economically infeasible.

It is very difficult for the operation and management company of new and renewable energy power stations to select a site after consultation with stakeholders related to the site every time a new and renewable energy farm, which is characterized by exclusive space utilization, is constructed, and this operation is likely to become a task of extreme difficulty.

Above all, in the area where a new and renewable energy farm will be created, the proportion of local residents who participate in building new and renewable energy power stations (offshore wind power stations) among the residents engaged in fishing practices is low. Further, there is a high awareness among the residents that building power stations is lack of profitability and economic feasibility and is thus not turned into money. For these reasons, there has been difficulty in attracting investment from local residents.

In addition, development of an offshore wind farm among the new and renewable energy power stations takes large business investment and has high uncertainty, and in most cases, it tends to be a public project. Accordingly, various stakeholders participating in the development of the farm are greatly interested in calculation of an appropriate investment cost of the project and transparent spending of money. However, there is a lack of development of systems for estimating the sustainable cost and analyzing economic feasibility on an objective/consistent basis in project development and construction stages.

PRIOR ART LITERATURE

Patent Document

Korean Patent Application Publication No. 10-2009-0002295

SUMMARY OF THE INVENTION

Therefore, the present invention has been made in view of the above problems, and it is an object of the present invention to provide an apparatus and method for encouraging participation of residents in building a new and renewable energy farm through notification of economic feasibility analysis with a new and renewable energy FinTech platform module that can guide the residents in an area where a new and renewable energy power generator is installed to jointly purchase a new and renewable energy power generator that is installed and operated in advance, set unique IDs for the residents having purchased the new and renewable energy power generator, share the daily amount of electricity generated from the new and renewable energy power generator, cash exchange data, and 1:1 revenue dividends, provide countermeasures against hacking attacks, retransmission attacks, and financial fraud, which have not been solved by the conventional financial service authentication techniques, through the new and renewable energy FinTech platform module, which includes a resource resident application module, a FinTech enterprise management server, a FinTech open platform and a resource server, upload economic feasibility of the new and renewable energy business model analyzed by a smart economic analysis simulation module, notify the residents of the uploaded economic feasibility, thereby enabling benefits of power generation to be shared between the residents and the power generation company and facilitating sharing of information about a power generation project, and boosting interest of the residents in new and renewable energy.

In accordance with an aspect of the present invention, the objects can be accomplished by the provision of an apparatus for encouraging participation of residents in building a new and renewable energy farm through notification of economic feasibility analysis with a new and renewable energy FinTech platform module, the apparatus comprising:

a new and renewable energy FinTech platform module (100) configured to advertise to the residents in an area where new and renewable energy power generators are installed, guide the residents to jointly purchase a new and renewable energy power generator that is installed and operated in advance, sets unique IDs for the residents having purchased the new and renewable energy power generator, allow a daily amount of electricity generated by the new and renewable energy power generator, cash exchange data, and a profit through 1:1 revenue dividends to be shared by the residents, and upload economic feasibility of a new and renewable energy business model analyzed by the smart economic feasibility simulation module to notify the residents of the economic feasibility;

a new and renewable energy power generator (200) configured to generate electric energy through wind power and sunlight and transmit 60% to 80% of a daily amount of generated electricity to the new and renewable energy generated power-to-cash change control unit;

a new and renewable energy generated power-to-cash change control unit (300) configured to change 60% to 80% of the daily amount of electricity generated from the new and renewable energy power generator into cash and notify the new and renewable energy FinTech platform module of cash exchange data corresponding to the daily amount of generated electricity in real time;

a cloud computing module (400) configured to store and manage unique IDs of the residents, the daily amount of electricity generated by the new and renewable energy power generator, and reference information data necessary for change of new and renewable energy power into money as database (DB) data; and a smart economic feasibility analysis simulation module (500) configured to retrieve the data stored in the cloud computing module and analyze new and renewable energy business model economic feasibility and transmit the analyzed business model economic feasibility to the new and renewable energy FinTech platform module.

In accordance with another aspect of the present invention, the objects can be accomplished by the provision of A method for encouraging participation of residents in building a new and renewable energy farm through notification of economic feasibility analysis with a new and renewable energy FinTech platform module, the method comprising:

a step (S100) of guiding the residents in an area where a new and renewable energy power generator is installed so as to jointly purchase the new and renewable energy power generator that is installed and operated in advance and setting unique IDs for the residents having purchased the new and renewable energy power generator, through a new and renewable energy FinTech platform module;

a step (S200) of the new and renewable energy power generator generating electric energy through wind power and sunlight and transmitting 60% to 80% of a daily amount of generated electricity to a new and renewable energy generated power-to-cash change control unit;

a step (S300) of a new and renewable energy generated power-to-cash change control unit changing 60% to 80% of the daily amount of electricity generated from the new and renewable energy power generator into cash and notifying a new and renewable energy FinTech platform module of cash exchange data corresponding to the daily amount of generated electricity;

a step (S400) of storing and managing unique IDs of residents, the daily amount of generated electricity of the new and renewable energy power generator, and reference information data necessary for estimation of a cost of new and renewable energy as database (DB) data through a cloud computing module;

a step (S500) of a smart economic feasibility analysis simulation module retrieving the data stored in the cloud computing module, analyzing economic feasibility of a new and renewable energy business model, and transmitting the analyzed business model economic feasibility to the new and renewable energy FinTech platform module; and a step (S600) of the new and renewable energy FinTech platform module uploading the new and renewable energy business model economic feasibility analyzed by the smart economic feasibility analysis simulation module and notifying residents of the same while sharing the daily amount of electricity generated by the new and renewable energy power generator, cash exchange data, and a profit through 1:1 revenue dividends.

BRIEF DESCRIPTION OF THE DRAWINGS

The above and other objects, features and other advantages of the present invention will be more clearly understood from the following detailed description taken in conjunction with the accompanying drawings, in which:

FIG. 18 is a graph depicting calculation of the amount of power generation in a new and renewable energy farm based on the environmental conditions of the new and renewable energy farm and the turbine configuration through an AEP module according to the present invention;

FIG. 28 is a diagram illustrating a process in which a smart economic feasibility analysis simulation module according to the present invention retrieves data stored in a cloud computing module, analyzes the economic feasibility of a new and renewable energy business model and the economic feasibility of a power demand management project, and then transmits the analyzed economic feasibility of the business model and economic feasibility of the power demand management project to a new and renewable energy FinTech platform module.

DETAILED DESCRIPTION OF THE INVENTION

Figure 1:
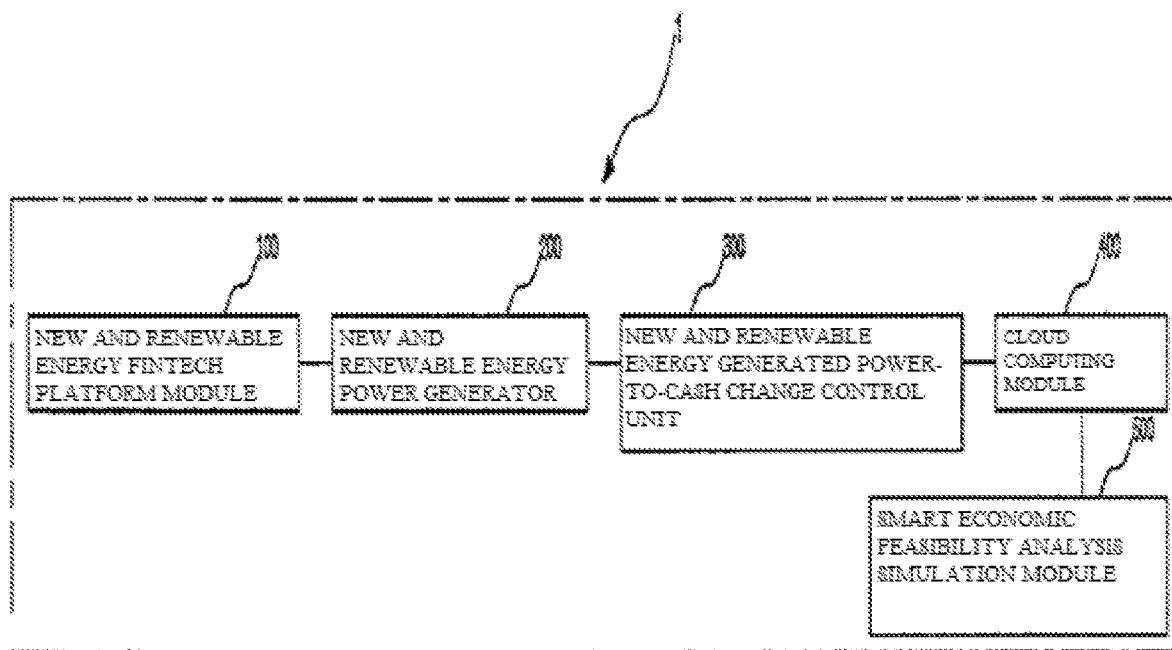
FIG. 1 is a block diagram illustrating elements of an apparatus 1 for encouraging participation of residents in building a new and renewable energy farm through an economic feasibility analysis notification with a new and renewable energy FinTech platform module according to the present invention.

Now, preferred embodiments of the present invention will be described in detail with reference to the accompanying drawings.

First, as used herein, the term FinTech, which is a combination of finance and technology, refers to a service that advertises to the residents in an area where new and renewable energy power generators are installed, guides the residents to jointly purchase a new and renewable energy power generator that is installed and operated in advance, sets unique IDs for the residents having purchased the new and renewable energy power generator, allows the daily amount of electricity generated from the new and renewable energy power generator, cash exchange data, and 1:1 revenue dividends and profit from participation in a power demand management project to be shared by the residents, thereby elevating the rate of recognition that new and renewable energy is turned into money and improving the participation rate of the residents in building a new and renewable energy farm.

In addition, the new and renewable energy described in the present invention refers to energy such as solar energy, wind energy, geothermal energy, bio energy, and marine energy that are obtained by recycling existing fossil fuels or converting energy that can be renewed. In the present invention, the description will focus on solar energy and wind energy.

As used herein, the term "economic feasibility analysis" refers to analyzing and evaluating the economic feasibility regarding maximizing social welfare during or after preparation of a project plan. The economic feasibility analysis, which is mainly described in the specification, is divided into economic feasibility analysis of a new and renewable energy business model and economic feasibility analysis of electric power demand management project, which are performed by loading the data stored in a cloud computing module.

The present invention has the following differences over the conventional art.

First, the present invention is applied to a FinTech apparatus for encouraging resident participation in building a new and renewable energy farm. Thereby, it advertises to the residents in an area where new and renewable energy power generators are installed, guides the residents to jointly purchase a new and renewable energy power generator that is installed and operated in advance, and sets unique IDs for the residents having purchased the new and renewable energy power generator such that the daily amount of electricity generated by the new and renewable energy power generator, cash exchange data, and the profit through 1:1 revenue dividends and profits through participation in a power demand management project are shared by the residents.

Second, the result of economic feasibility analysis of the new and renewable energy business model and the result of economic feasibility analysis of the power demand management project (new and renewable energy power station) are provided to the power generation company or the residents' smart devices in real time such that profits are shared by the power generation company and the residents.

Hereinafter, preferred embodiments of the present invention will be described with reference to the drawings.

Figure 2:
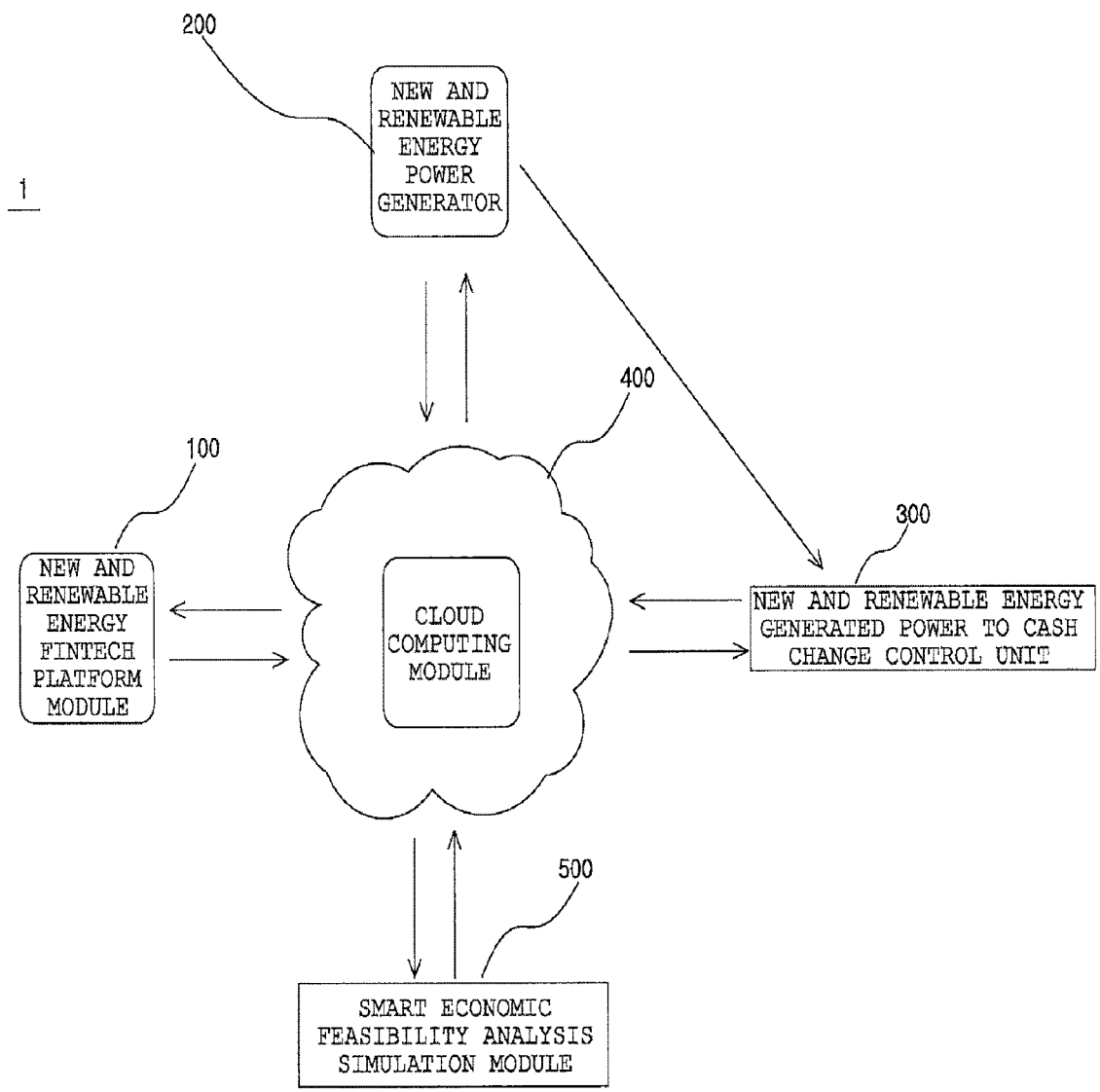
FIG. 2 is a configuration diagram illustrating elements of the apparatus 1 for encouraging participation of residents in building a new and renewable energy power station through an economic feasibility analysis notification with a new and renewable energy FinTech platform module according to the present invention.

FIG. 1 is a block diagram illustrating elements of an apparatus 1 for encouraging participation of residents in building a new and renewable energy farm through economic feasibility analysis notification with a new and renewable energy FinTech platform module according to the present invention, and FIG. 2 is a configuration diagram illustrating elements of the apparatus 1 for encouraging participation of residents in building a new and renewable energy power station through an economic feasibility analysis notification with a new and renewable energy FinTech platform module according to the present invention. The resident participation encouraging apparatus 1 includes a new and renewable energy FinTech platform module 100, a new and renewable energy power generator 200, a new and renewable energy generated power-to-cash change control unit 300, a cloud computing module 400, and a smart economic feasibility analysis simulation module 500.

The new and renewable energy FinTech platform module 100 according to the present invention will be described first.

The new and renewable energy FinTech platform module 100 advertises to the residents in an area where new and renewable energy power generators are installed, guides the residents to jointly purchase a new and renewable energy power generator that is installed and operated in advance, sets unique IDs for the residents having purchased the new and renewable energy power generator, allows the daily amount of electricity generated from the new and renewable energy power generator, cash exchange data, and the profit through 1:1 revenue dividends to be shared by the residents, and uploads the economic feasibility of the new and renewable energy business model analyzed by the smart economic feasibility simulation module to notify the residents of the economic feasibility.

Figure 3:
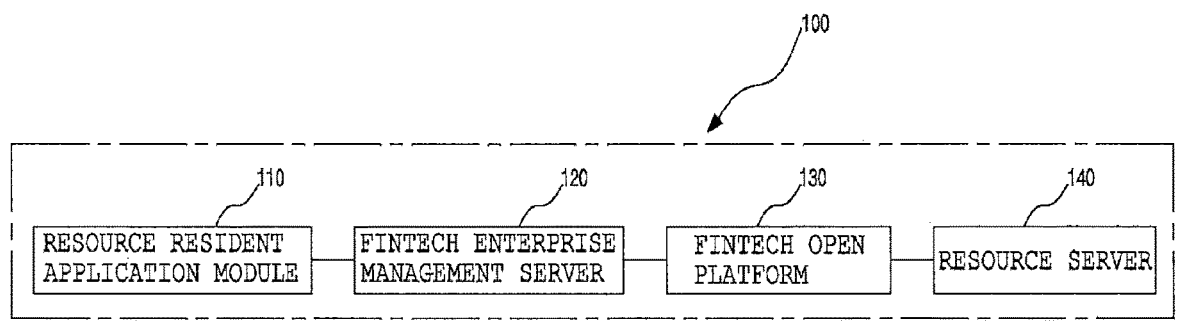
FIG. 3 is a block diagram illustrating elements of a new and renewable energy FinTech platform module according to the present invention.

As shown in FIG. 3, the new and renewable energy FinTech platform module 100 includes a resource resident application module 110, a FinTech enterprise management server 120, a FinTech open platform 130, and a resource server 140.

The resource resident application module 110 according to the present invention will be described below.

The resource resident application module 110 is activated in the form of an application on the smart devices of the residents in an area where the new and renewable energy power generator is installed, and functions to register information on the residents and request FinTech API services (e.g., inquiry service, transfer service, etc.) with the FinTech enterprise management server for joint purchase of the new and renewable energy power generator and to convert FIN ACCOUNT, which is a FinTech ID code, into a disposable virtual account.

The resource resident application module 110 generates a random key value for execution of authentication with the FinTech enterprise management server.

The resource resident application module 110 also presents the daily amount of electricity generated from the new and renewable energy power generator, money corresponding to the new and renewable energy power, 1:1 revenue dividends, profit from participation in a power demand management project, and the economic feasibility of the power demand management project, which is analyzed by the smart economic analysis simulation module, in real time.

Next, the FinTech enterprise management server 120 according to the present invention will be described.

The FinTech enterprise management server 120 makes a request to the FinTech open platform for registration of the residents making a joint purchase of a new and renewable energy power generator and conversion of the account numbers of the residents making the joint purchase of the new and renewable energy power generator into token accounts, and serves to process a financial service requested by the resource resident module.

Figure 4:
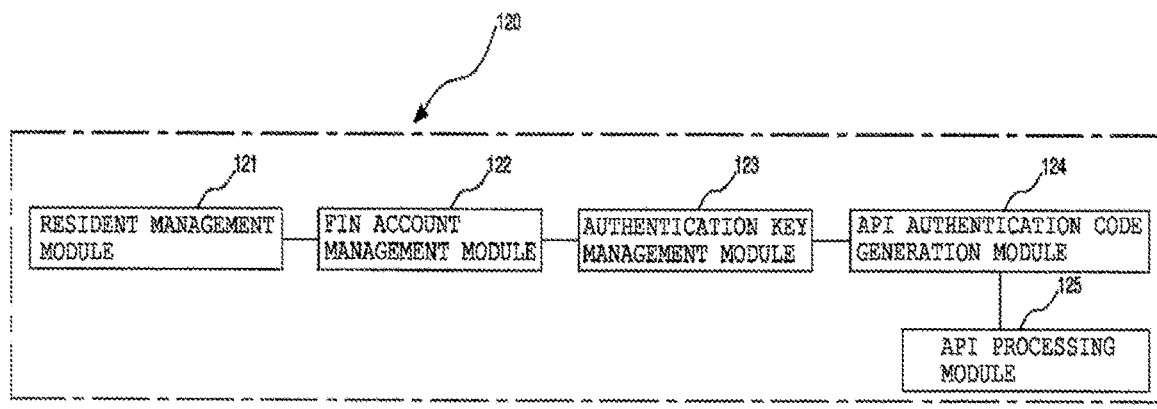
FIG. 4 is a block diagram illustrating elements of a FinTech enterprise management server according to the present invention.

As shown in FIG. 4, the FinTech enterprise management server 120 includes a resident management module 121, a FIN ACCOUNT management module 122, an authentication key management module 123, an API authentication code generation module 124, and an API processing module 125.

The resident management module 121 functions to generate a server random value for sign up of residents and an authentication process with the residents, to provide a financial API list of the residents and manage a FinTech API list requested by the residents, to deliver a FinTech API request of the residents to the authentication server and to send a result of request processing to the residents.

The FIN account management module 122 manages the FIN accounts created on the FinTech open platform.

The FIN account management module 122 may prevent leakage and exposure of financial information because it handles FinTech API services using the FIN accounts rather than the actual accounts of the resident. The FIN account management module 122 also functions to create FIN accounts for one-time use and provides random virtual accounts for the residents.

In order to use a FinTech API service, the authentication key management module 123 transmits an IP address of a resident, a Host name, and a Mac address to the FinTech open platform (authentication server), creates a resident identifier (Client_id) and an authentication secret key (Client_Secret) and transmits the same together with the information registered with the FinTech open platform to the resident.

In other words, when there is a request for a FinTech API service from a resident, the authentication key management module 123 makes a request to the authentication server with Client_id and requests authentication using a Client_Secret key value for authentication of the resident.

Then, Client_id and the Client_Secret key value are encrypted, stored and managed.

The API authentication code generation module 124 generates an API authentication code for the credentials of the client when the FinTech API is requested.

In order to generate the API authentication code, the API authentication code generation module 124 transmits Client_id and the Client_Secret key value allocated by the FinTech open platform to the authentication server. After the FinTech open platform verifies the transmitted key value, the FinTech open platform generates a nonce (random number).

The API authentication code generation module 124 generates a hash value by combining the received nonce with the IP, host name, and MAC address values registered with the FinTech open platform.

In addition, to enhance security, the API authentication code generation module 124 generates a time-based OTP value and binds a created message to transmit an API authentication code value, i.e. an OTA (One Time Authentication) value, to the FinTech open platform.

The API processing module 125 notifies the resource resident application module of a result of API processing received from the FinTech open platform after completion of processing of the FinTech API service for the resident.

Next, the FinTech open platform 130 according to the present invention will be described.

The FinTech open platform 130 creates and stores a virtual token account for one time use corresponding to the account of a resident, and transmits the generated token account value to the resource resident application module.

Figure 5:
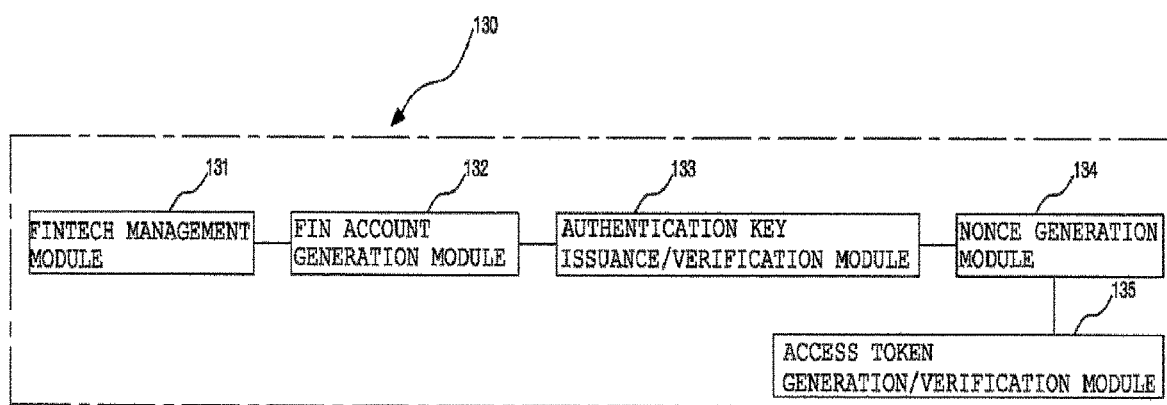
FIG. 5 is a block diagram illustrating elements of a FinTech open platform according to the present invention.

As shown in FIG. 5, the FinTech open platform 130 includes a FinTech management module 131, a FIN account generation module 132, an authentication key issuance/verification module 133, a nonce generation module 134, and an access token generation/verification module 135.

The FinTech management module 131 serves to register and process FinTech membership of residents, request and process cooperation agreements, and request and process use of APIs.

The FIN account generation module 132 converts a financial account number registered by the resident into an account for the FinTech service.

Here, the FIN account is created by converting a real account according to a FIN account identification code conversion rule and is stored in the database (DB) server by mapping the FIN account to the real account.

The FIN account generation module 132 is also configured to convert a FIN account into a real account to process a FinTech API service requested by a resident.

The authentication key issuance/verification module 133 generates Client_id and a Client_Secret key value to be used by a resident after verifying the IP, host name, and MAC Address registered by a request from the resident.

Here, client_id and client_secret have random 16-byte values generated through a random number generation algorithm.

The nonce generation module 134 generates a server random value for generating an API authentication code value.

The FinTech enterprise management server will use the generated nonce value in generating an OTA (One Time Authentication) value, that is, an API authentication code, to generate a nonce value.

The access token generation/verification module 135 serves to generate a key value for processing of the FinTech API service.

After checking the OTA value, if the OTA value is valid, the access token generation/verification module 135 generates an access token value and transfers the same to the FinTech enterprise management server.

To prevent retransmission attacks, the access token is generated anew for one time use each time the FinTech API is requested.

The generated access token is delivered together with a FinTech API service when the FinTech API service is requested, and is compared with the transmitted access token. The transmitted access token is subjected to a comparison operation. Use of the API is allowed when the access token is valid.

Next, the resource server 140 according to the present invention will be described.

The resource server 140 actually processes the FinTech API service requested by the FinTech open platform and changes 60% to 80% of the daily amount of electricity generated from the new and renewable energy power generator into cash, and equally distributes the cash to the IDs set through the new and renewable energy power generation FinTech platform module, and notifies the resource resident application module of the processing result and the economic feasibility of the new and renewable energy business model analyzed by the smart economic feasibility analysis simulation module in real time.

Next, the new and renewable energy power generator 200 according to the present invention will be described.

The new and renewable energy power generator 200 generates electric energy through wind power and sunlight and transmits 60% to 80% of the daily amount of produced electricity to the new and renewable energy generated power-to-cash change control unit.

The new and renewable energy power generator 200 is located near the residence of the residents, and is configured by selecting either the wind power generator 210, the offshore wind power generator 220, or the solar power generator 230.

Figure 6:
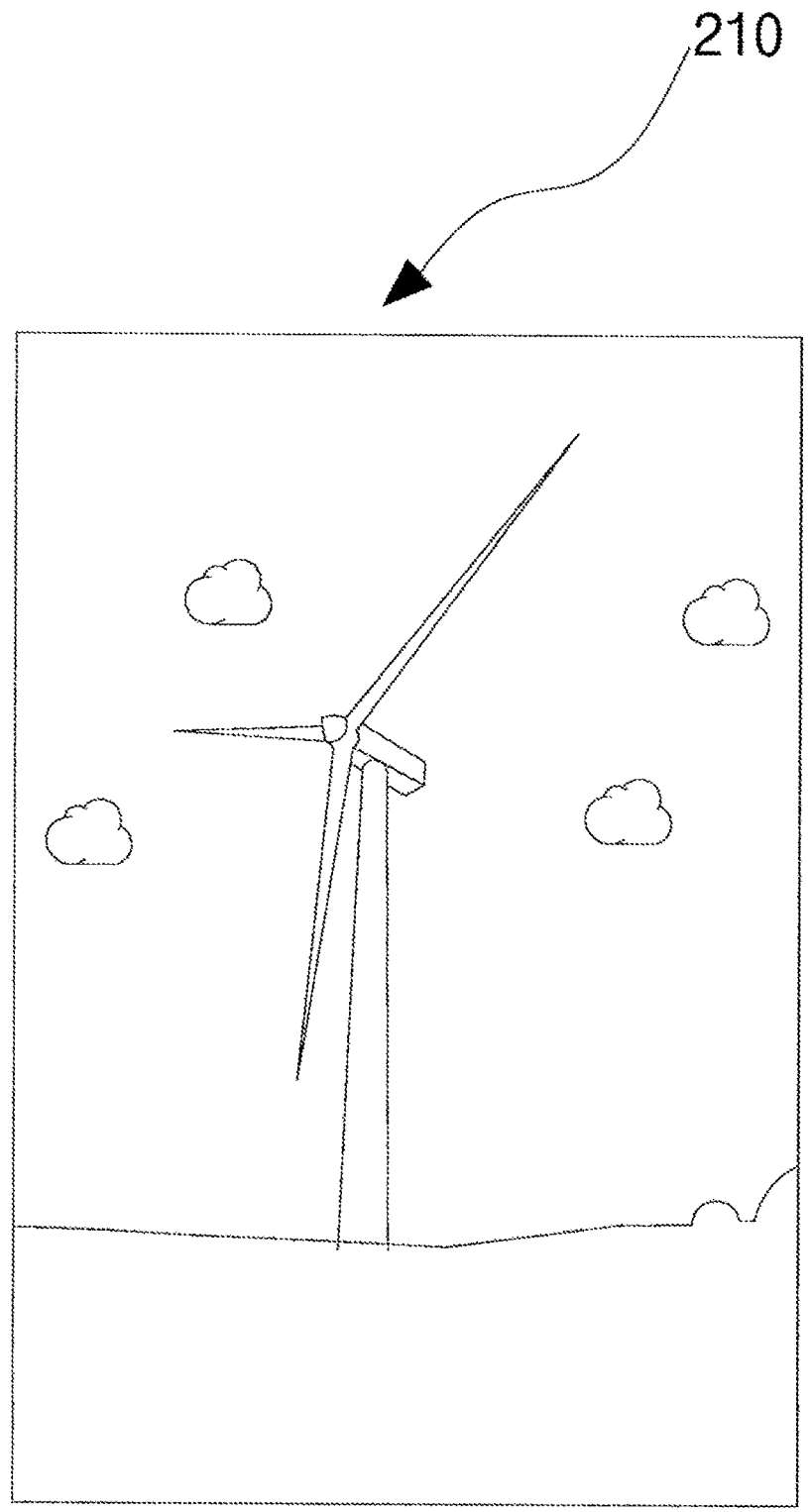
FIG. 6 is a diagram illustrating configuration of a wind power generator among new and renewable energy power generators according to an embodiment of the present invention.

As shown in FIG. 6, the wind power generator 210 is installed at a place where wind blows on land, and generates electric energy through rotation by wind power.

Figure 7:
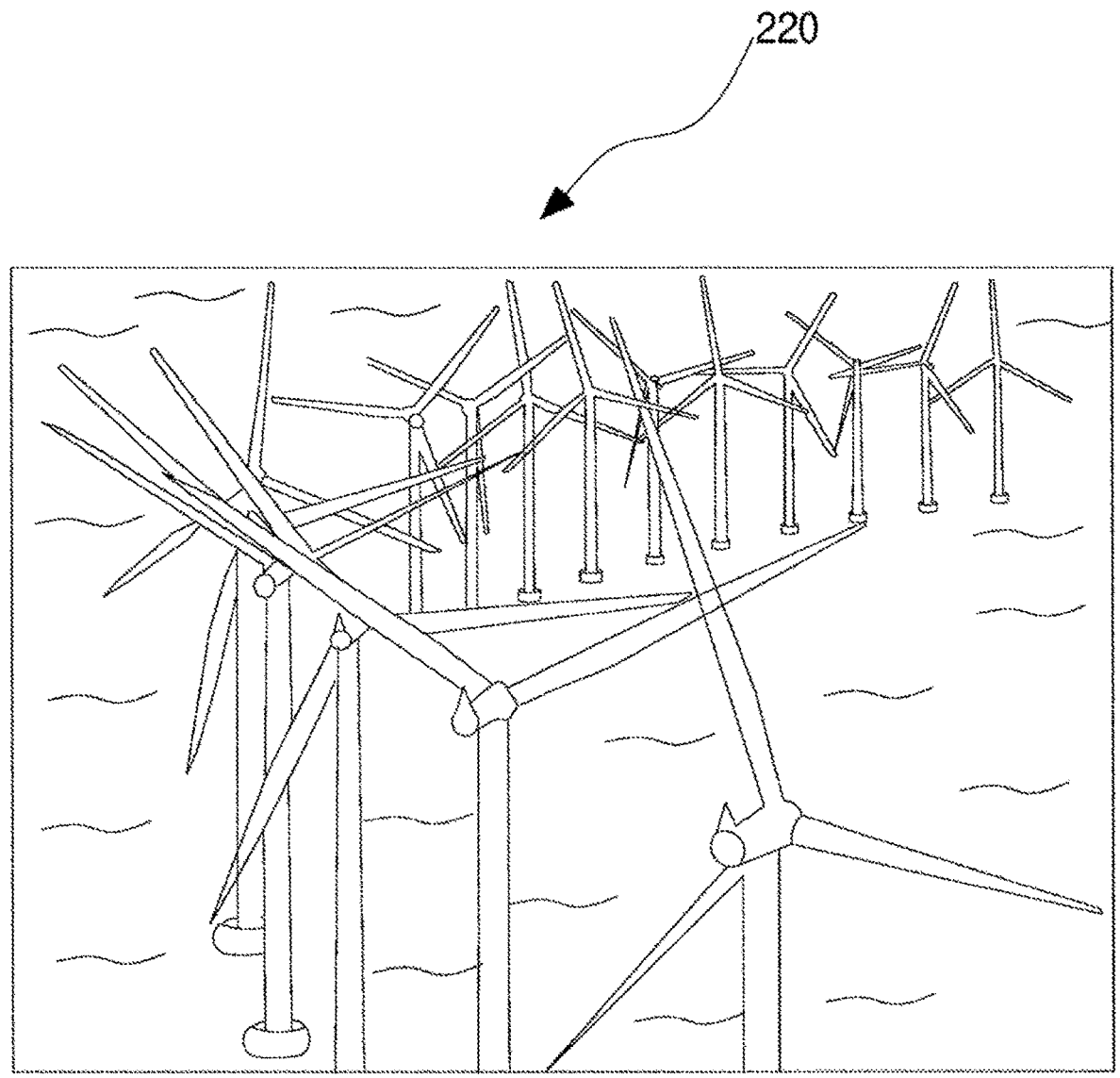
FIG. 7 is a diagram illustrating configuration of offshore wind power generators among new and renewable energy power generators according to an embodiment of the present invention.

As shown in FIG. 7, the offshore wind power generator 220 is installed at a place where wind blows at sea, and generates electric energy through rotation by wind power.

Figure 8:
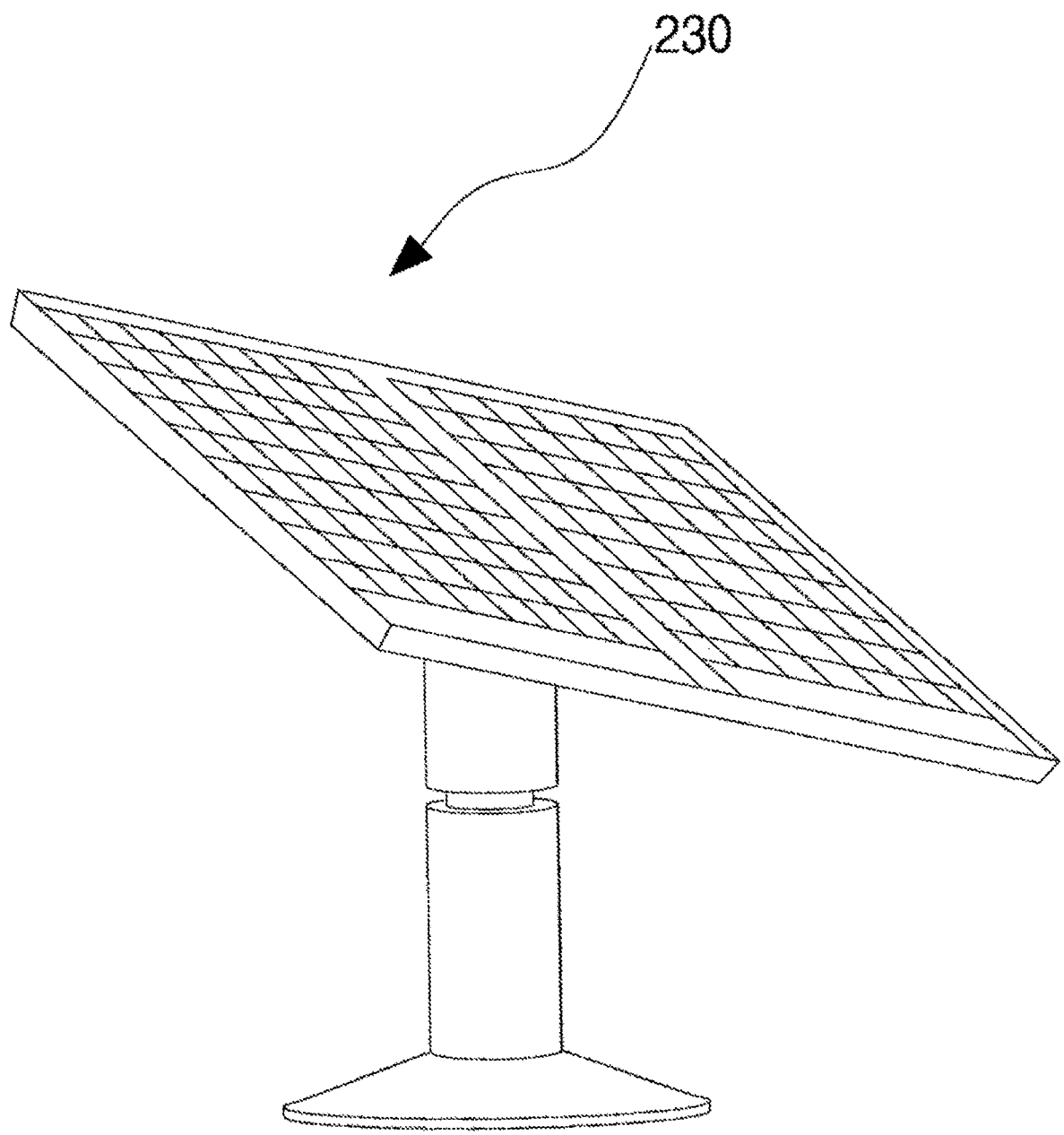
FIG. 8 is a diagram illustrating configuration of a solar power generator among new and renewable energy power generators according to an embodiment of the present invention.

As shown in FIG. 8, the solar power generator 230 is provided with a plurality of solar cells to generate electric energy from sunlight.

Next, the new and renewable energy generated power-to-cash change control unit 300 according to the present invention will be described.

The new and renewable energy generated power-to-cash change control unit 300 changes 60% to 80% of the daily amount of electricity generated from the new and renewable energy power generator into cash, and then notifies the new and renewable energy FinTech platform module of the cash exchange data corresponding to the daily amount of produced electricity in real time.

Figure 9:
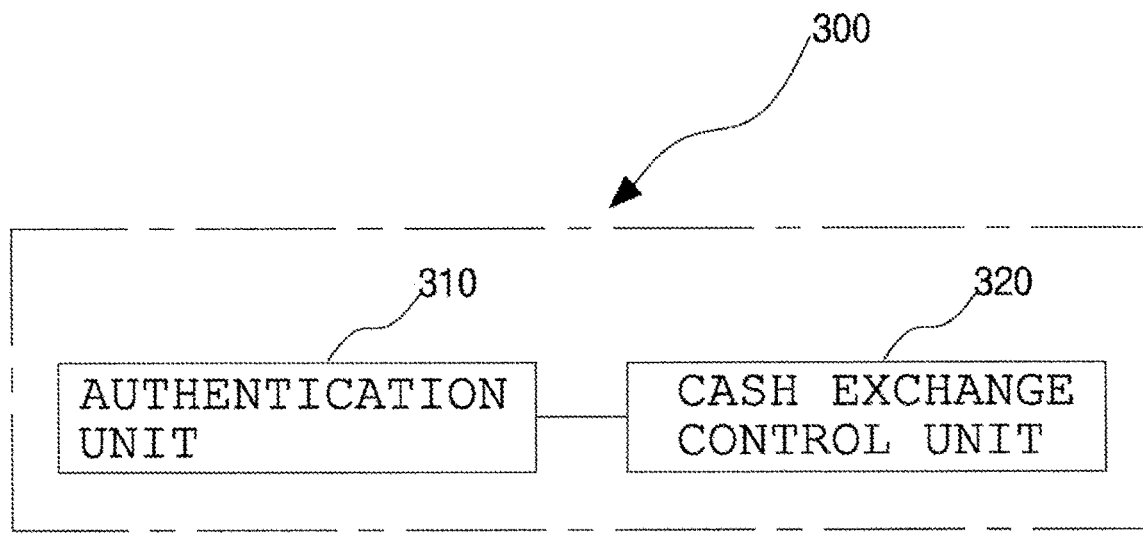
FIG. 9 is a block diagram illustrating elements of a new and renewable energy generated power-to-cash change control unit according to the present invention.

As shown in FIG. 9, the new and renewable energy generated power-to-cash change control unit 300 includes an authentication unit 310 and a cash exchange control unit 320.

The authentication unit 310 activates the App to input an ID of the application module and a password.

When authentication is completed through the authentication unit, the cash exchange control unit 320 connects to a bank server and transmits 60% to 80% of the daily amount of electricity generated from the new and renewable energy power generator to the resource resident application module desiring cash exchange or change of profits of the residents participating in the power demand management project into cash.

Next, the cloud computing module 400 according to the present invention will be described.

The cloud computing module 400 stores and manages unique IDs of residents, the daily amount of electricity produced by the new and renewable energy power generator, and reference information data necessary for change of new and renewable energy power into money as DB data.

Figure 10:
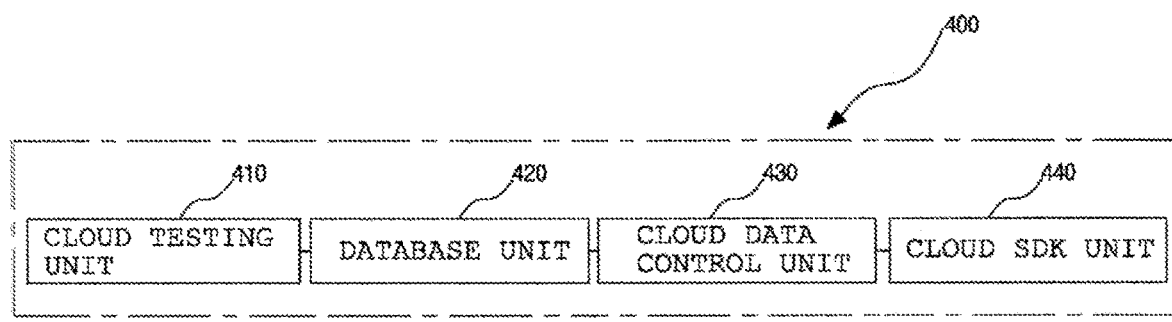
FIG. 10 is a block diagram illustrating elements of a cloud computing module according to the present invention.

As shown in FIG. 10, the cloud computing module 400 includes a cloud testing unit 410, a database unit 420, a cloud data control unit 430, and a cloud SDK (Software Development Kit) unit 440.

First, the cloud testing unit 410 according to the present invention will be described.

The cloud testing unit 410 performs error and safety verification on the smart economic feasibility analysis simulation module to perform direct verification of the smart economic feasibility analysis simulation module.

Figure 11:
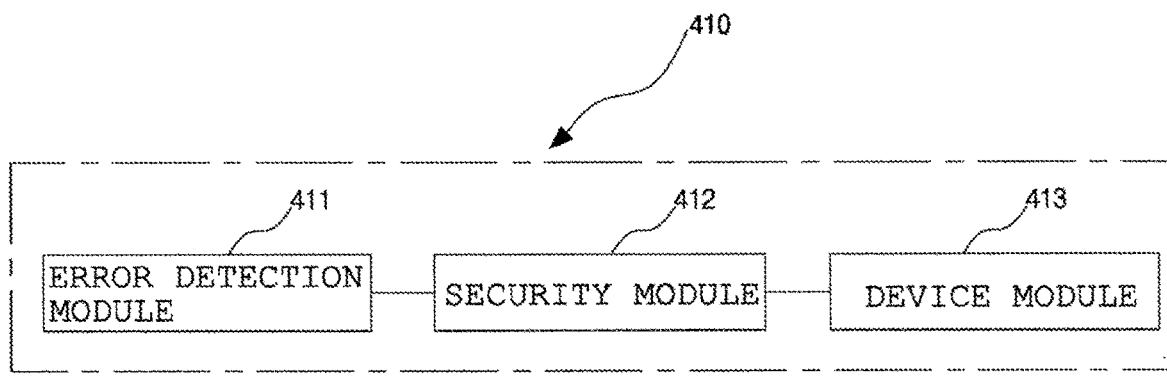
FIG. 11 is a block diagram illustrating elements of a cloud testing unit according to the present invention.

As shown in FIG. 11, the cloud testing unit 410 includes an error detection module 411, a security module 412, and a device module 413.

The error detection module 411 serves to detect an error in the smart economic feasibility analysis simulation module. If no error is found, the error detection module 411 transmits the result to the security module.

The security module 412 verifies contents included in the smart economic feasibility analysis simulation module and, if there is no abnormality, transmits the verification result to the device module.

The device module 413 performs verification of use of a non-ideal function of the website on which the smart economic feasibility analysis simulation module is installed.

Next, the database unit 420 according to the present invention will be described.

The database unit 420 is connected to the new and renewable energy FinTech platform module to collect and store the unique IDs of the residents, the daily amount of electricity generated by the new and renewable energy power generator, and money corresponding to the new and renewable energy power and then provide a necessary database.

Next, the cloud data control unit 430 according to the present invention will be described.

The cloud data control unit 430 provides a cloud service to the smart economic feasibility analysis simulation module using the cloud computing technology, persistently detects malicious code and virus related to the smart economic feasibility analysis simulation module, and stores the authentication code of the user.

Figure 12:
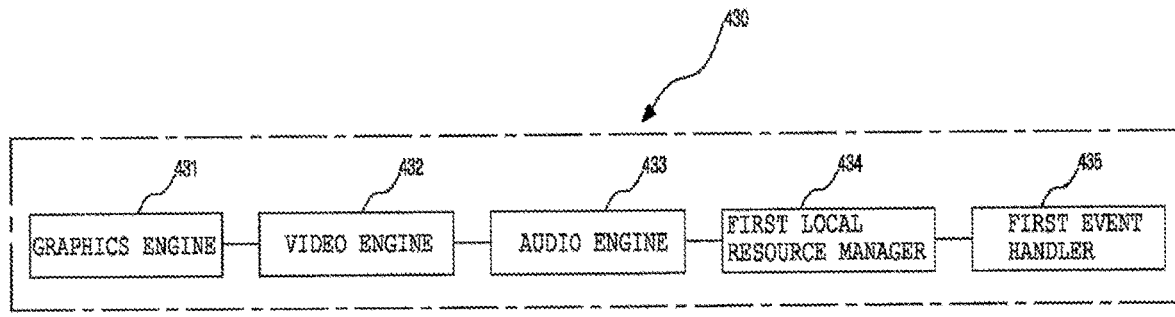
FIG. 12 is a block diagram illustrating elements of a cloud data control unit according to the present invention.

As shown in FIG. 12, the cloud data control unit 430 includes a graphics engine 431, a video engine 432, an audio engine 433, a first local resource manager 434, and a first event handler 435.

The graphics engine 431 performs a basic graphics function for image processing.

The video engine 432 processes the video playback function and transmits each video frame to the cloud application module for analysis of economic feasibility.

The audio engine 433 transmits the sound reproduced by the smart economic feasibility analysis simulation module to the smart economic feasibility analysis simulation module.

The first local resource manager 434 serves to process download of resource information of the client website.

The first event handler 135 serves to process events received from the smart economic feasibility analysis simulation module.

Next, the cloud SDK (Software Development Kit) unit 440 according to the present invention will be described.

The cloud SDK (Software Development Kit) unit 440 builds a development environment for a smart economic feasibility analysis simulation module according to the user's intention, and creates the smart economic feasibility analysis simulation module through editing and correction. Then, the cloud SDK unit 440 updates the smart economic feasibility analysis simulation module with the created smart economic feasibility analysis simulation module through overriding.

The cloud SDK unit 440 provides APIs for developing a new cloud application module for economic feasibility analysis.

In other words, the cloud SDK unit 440 wraps a function provided by a lower layer and edits and corrects the GUI components to create a new smart economic feasibility analysis simulation module.

Next, the smart economic feasibility analysis simulation module 500 according to the present invention will be described.

The smart economic feasibility analysis simulation module 500 retrieves the data stored in the cloud computing module and analyzes the new and renewable energy business model economic feasibility and then transmits the analyzed business model economic feasibility to the new and renewable energy FinTech platform module.

Figure 13:
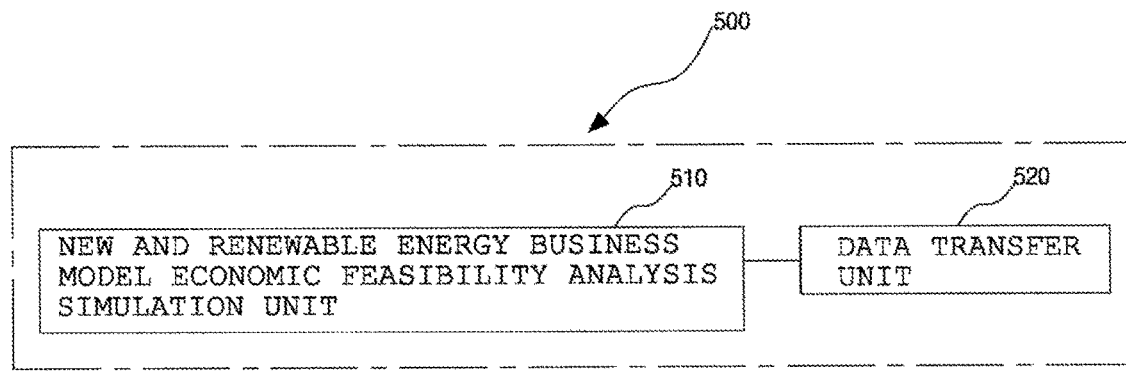
FIG. 13 is a block diagram illustrating elements of a smart economic feasibility analysis simulation module according to the present invention.

As shown in FIG. 13, the smart economic feasibility analysis simulation module 500 includes a new and renewable energy business model economic feasibility analysis simulation unit 510 and a data transfer unit 520.

First, the new and renewable energy business model economic feasibility analysis simulation unit 510 according to the present invention will be described.

The new and renewable energy business model economic feasibility analysis simulation unit 510 serves to retrieve the reference information necessary for estimating the new and renewable energy cost as stored in the cloud computing module, estimate the cost of the new and renewable energy power generation equipment, analyze new and renewable energy business model economic feasibility including the expected profit of the new and renewable energy power generation equipment, and then transmit the data of the analyzed new and renewable energy business model economic feasibility to the data transfer unit.

Figure 14:
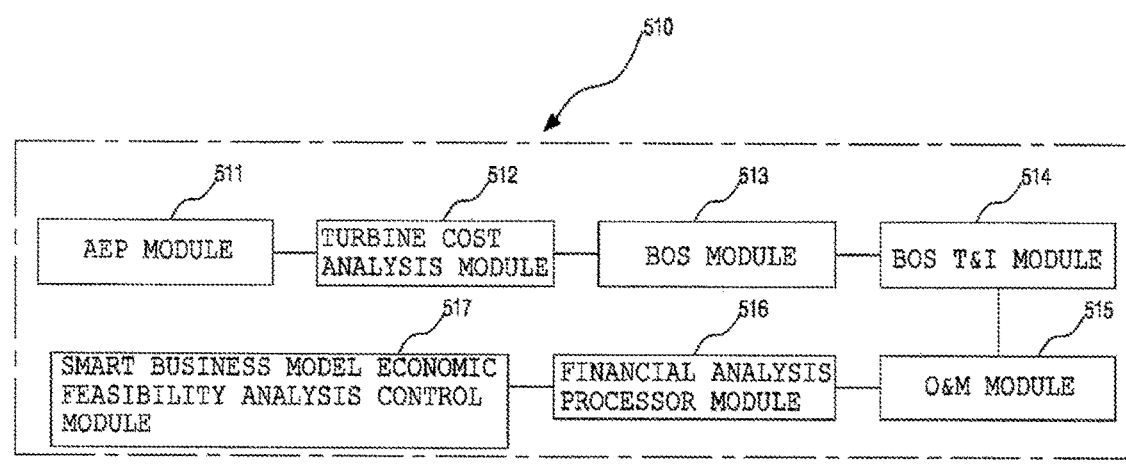
FIG. 14 is a block diagram illustrating elements of a new and renewable energy business model economic feasibility analysis simulation unit according to the present invention.

As shown in FIG. 14, the new and renewable energy business model economic feasibility analysis simulation unit 510 includes an annual energy production (AEP) module 511, a turbine cost analysis module 512, a balance of system (BOS) module 513, a BOS transport and installation (T&I) module 514, an operation and maintenance (O&M) module 515, a financial analysis processor module 516, and a smart business model economic feasibility analysis control module 517.

AEP Module 511

As shown in FIG. 18, the AEP module 511 serves to calculate the amount of power generation in a target new and renewable energy farm based on the environmental conditions of the new and renewable energy farm and the turbine configuration.

The AEP module 511 is configured to calculate a corrected performance curve for the turbine model of a new and renewable energy farm selected according to weather conditions (average wind speed and wind profile) at the site and to then estimate the annual energy production and the capacity factor of the selected turbine.

Figure 15:
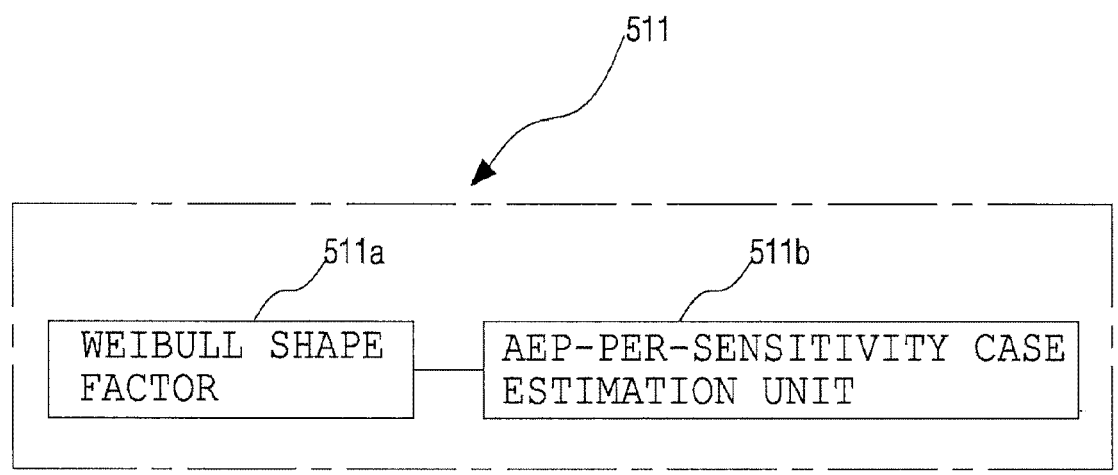
FIG. 15 is a block diagram illustrating elements of an AEP module according to the present invention.

As shown in FIG. 15, the AEP module 511 includes a Weibull shape factor 511*a* and an AEP-per-sensitivity case estimation unit 511*b*.

The Weibull shape factor 511*a* serves to analyze the wind profile in the new and renewable energy farm using the Weibull function.

The Weibull shape factor 511*a* uses shape factor 2, which shapes the Rayleigh distribution, as a default.

The Weibull shape factor is closely related to the average wind speed as well as the power generation amount as it determines the wind profile in the new and renewable energy farm.

The AEP module is configured to calculate the amount of lossy power generation by applying the efficiency of the farm and an additional (electrical and environmental) loss factor to a pre-calculated lossless power generation amount.

Then, the sensitivity considering the uncertainty of the AEP calculation in the new and renewable energy farm may be derived by estimating the AEP for each case.

Figure 16:
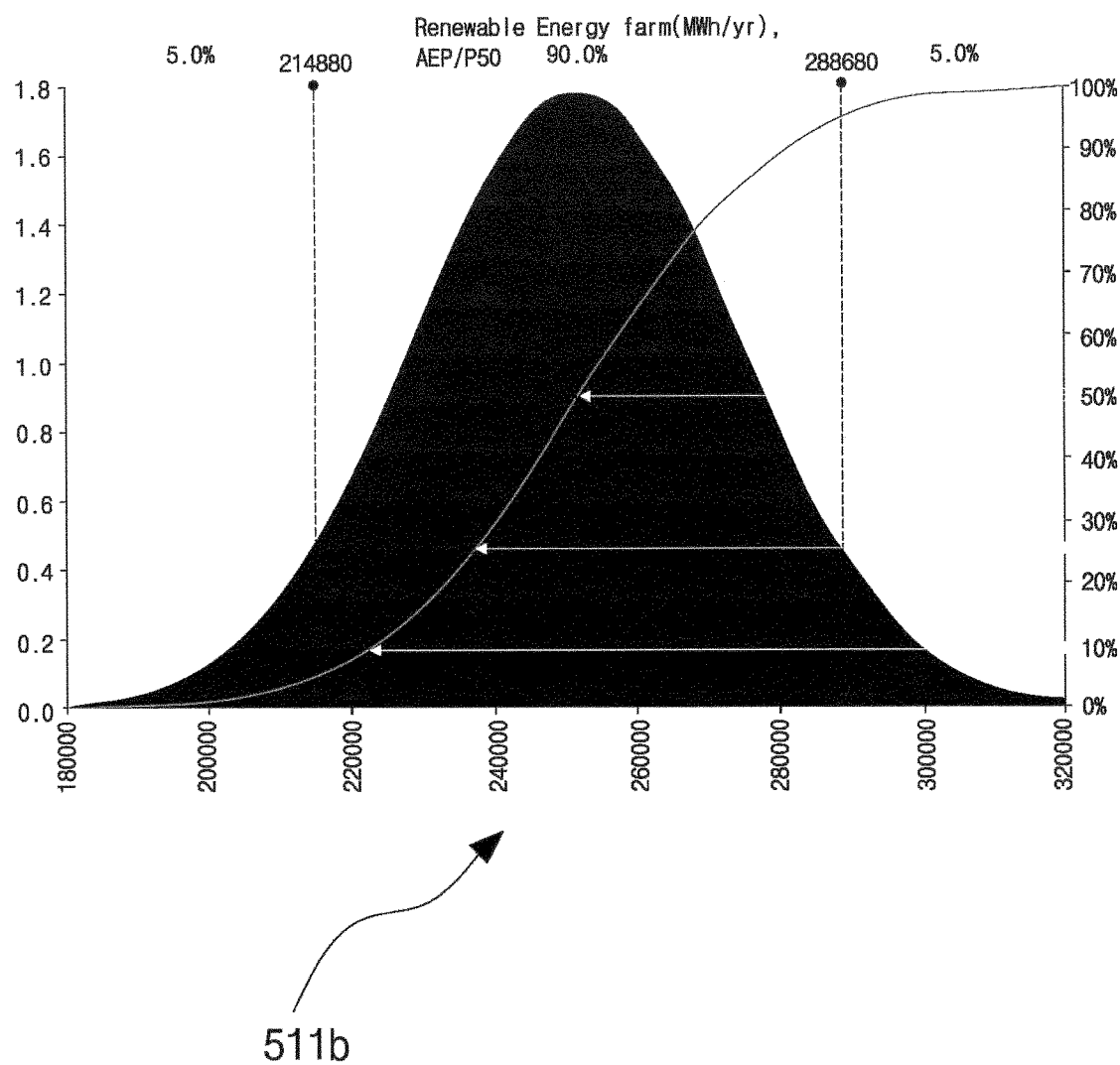
FIG. 16 is a graph depicting the AEP estimated by computing uncertainty risk factors, which may occur in the new and renewable energy power generation business, through an AEP estimation unit for each sensitivity case, wherein the actual energy production amount may be less than a predicted value at the time of evaluation of economic feasibility according to various uncertainty factors in the prediction process.

Since actual energy production may be less than the predicted value at the time of evaluation of economic feasibility due to various uncertainty factors in the prediction process, the AEP-per-sensitivity case estimation unit 511*b* estimates the AEP in consideration of uncertainty risk factors that can be incurred during the new and renewable energy power generation project, as shown in FIG. 16.

Here, the uncertainty risk factors include wind condition measurement accuracy, correlation, wind variability during the past data collection period, vertical extrapolation, future wind variability, fluid and wake modeling, and loss factor.

Figure 17:
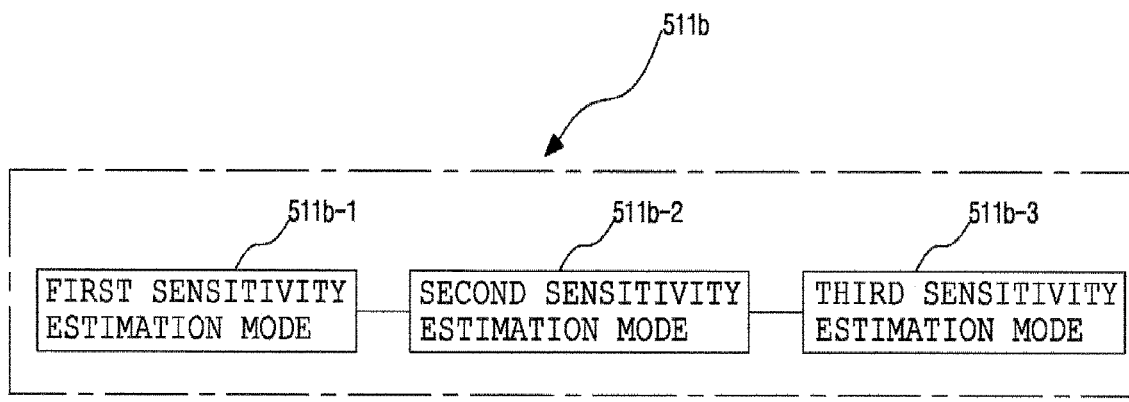
FIG. 17 is a block diagram illustrating elements of an AEP estimation unit for each sensitivity case according to the present invention.

As shown in FIG. 17, the AEP-per-sensitivity case estimation unit 511b is divided into a first sensitivity estimation mode 511b-1, a second sensitivity estimation mode 511b-2, and a third sensitivity estimation mode 511b-3 according to the sensitive cases.

The first sensitivity estimation mode 551b-1 serves to estimate that the probability that the actual production amount is larger or smaller than the predicted AEP is 50%.

The second sensitivity estimation mode 551b-2 serves to estimate that the probability that the actual production amount is larger than the predicted AEP is 75%.

The third sensitivity estimation mode 551b-3 serves to estimate that the probability that the actual production amount is larger than the predicted AEP is 90%.

The main input values to the AEP module include turbine model, Weibull shape factor, average wind speed, addition loss, hub height, effectiveness, turbine power curve, rotor diameter, and uncertainty.

The main result values of the AEP module include a daily energy output value and an AEP (annual energy production) per turbine.

Here, the AEP and capacity factor of an offshore wind farm are used for the turbine model and the wind speed function of the site, which are used in energy production.

The wind speed data of the offshore site are collected for at least 1 year and are used together with the wind speed data of other sites in deriving the Weibull shape factor.

Additionally, the main considerations in the new and renewable energy farm include the altitude, wind shear exponent, solar shear exponent, and height of the anemometer. In the case of a turbine, the hub height, rated output power, utilization rate, performance degradation rate, rated speed, and the like are used in adjusting the performance curve.

The adjusted performance curve of the turbine is used to calculate the energy output of the turbine and the capacity factor of the turbine that meet the given conditions.

Through the AEP module according to the present invention, the AEP of the new and renewable energy farm may be finally calculated by applying the farm efficiency of the target new and renewable energy farm and the additional loss factor.

Turbine Cost Analysis Module 512

Figure 19:
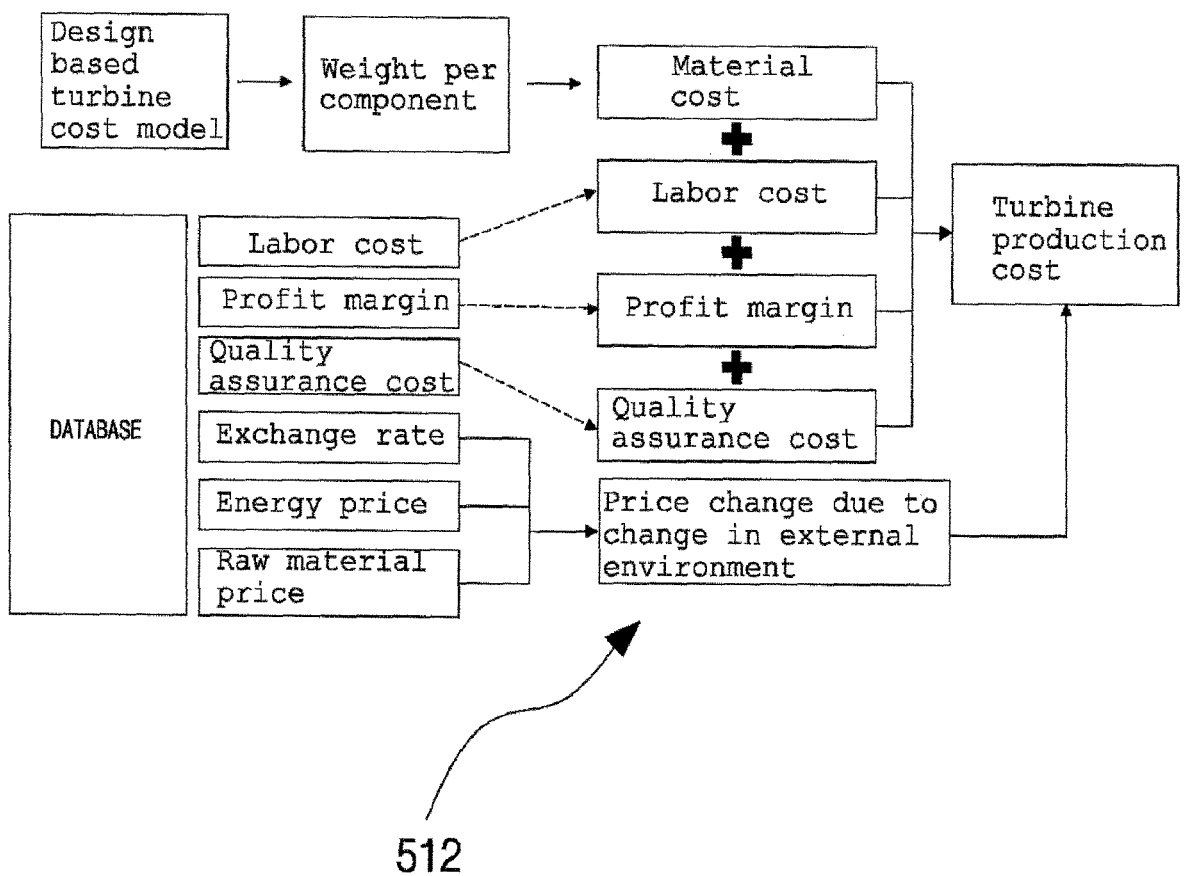
FIG. 19 is a block diagram illustrating a method for estimating the production cost of a turbine, which is an element of new and renewable energy power generation, through a turbine cost analysis module according to the present invention.
Figure 20:
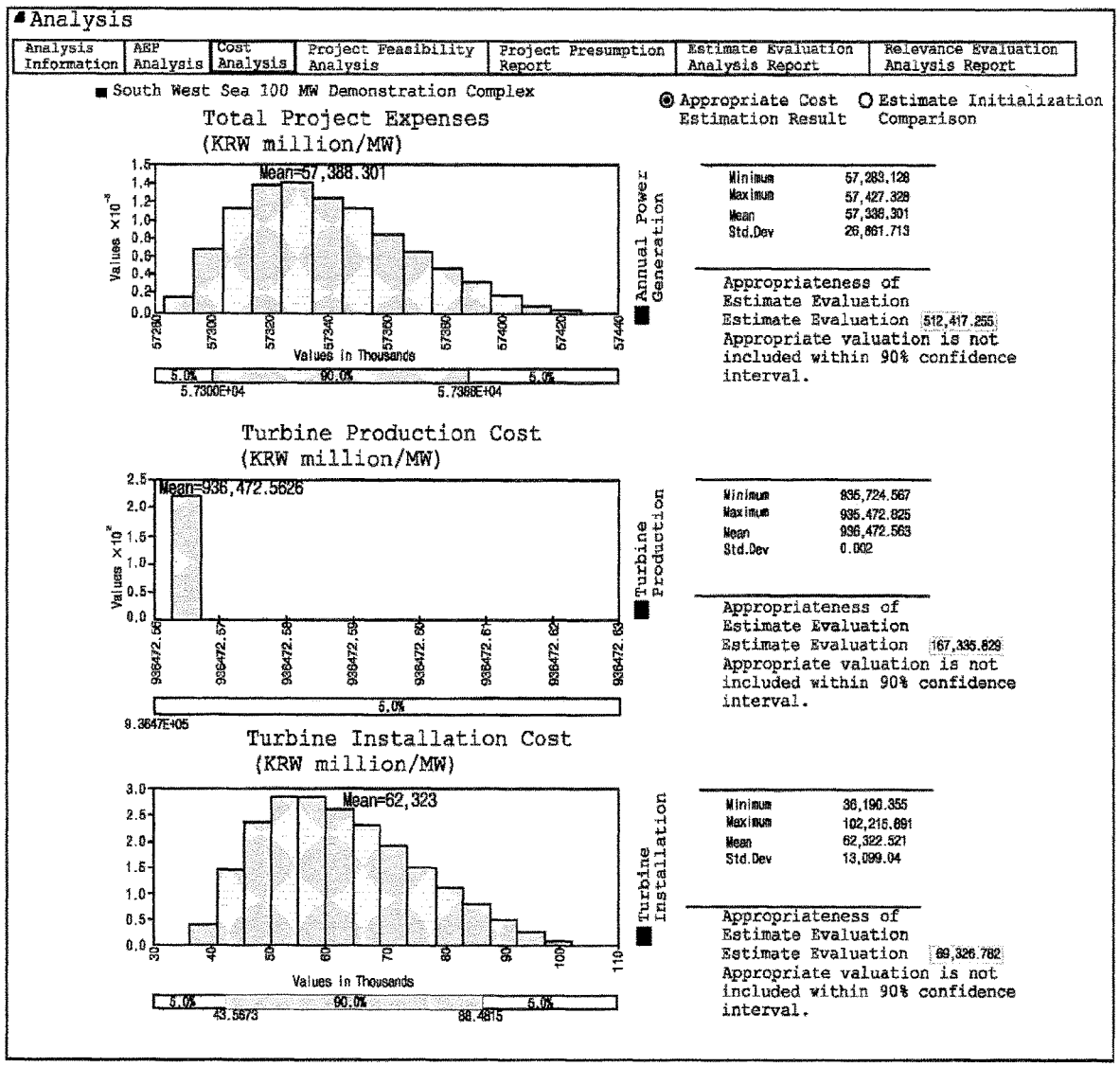
FIG. 20 is a graph depicting estimation of the production cost of the turbine, which is an element of new and renewable energy power generation, through the turbine cost analysis module according to the present invention.

As shown in FIGS. 19 and 20, the turbine cost analysis module 512 serves to estimate a production cost of the turbine, which is an element of new and renewable energy power generation.

Figure 21:
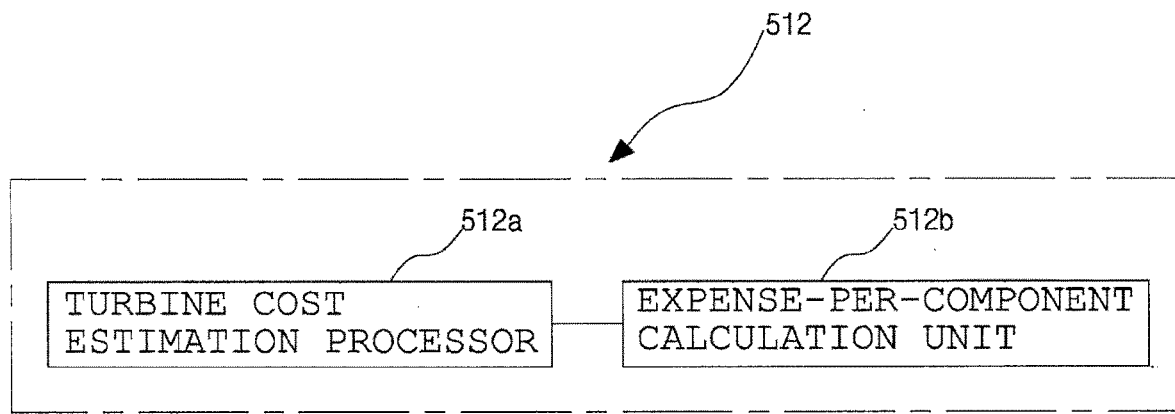
FIG. 21 is a block diagram illustrating elements of the turbine cost analysis module according to the present invention.

As shown in FIG. 21, the turbine cost analysis module 512 includes a turbine cost estimation processor 512a and an expense-per-component calculation unit 512b.

The turbine cost estimation processor primarily derives costs according to the weight and production cost of each turbine component considering the design factor, and then estimates the turbine cost by secondarily deriving the additional production cost and the cost change value according to the factor of turbine cost variation.

In this case, the main input values include the design factor and material cost of each component of the turbine, labor cost/profit margins/quality assurance cost for turbine production, major price of raw materials, energy price, exchange rate, and portion of turbine import.

The result values according to the input values include the weight and cost of each component constituting the turbine, and the total cost of manufacturing the turbine.

The turbine cost analysis module includes the expense-per-component calculation unit 512b.

The expense-per-component calculation unit 512b serves to calculate the expense based on the weight and production cost of each component of the turbine.

Here, the turbine includes both a wind turbine and an offshore wind turbine.

Figure 22:
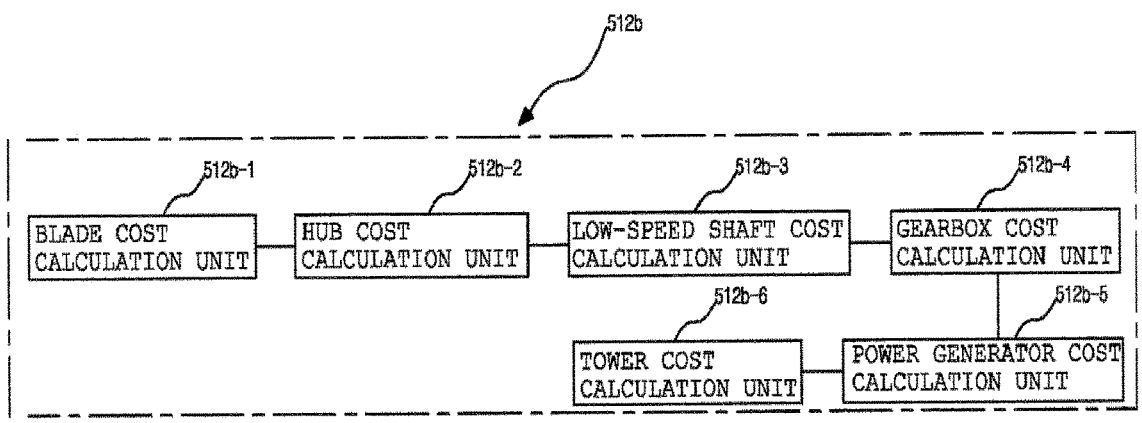
FIG. 22 is a block diagram illustrating elements of an expense-per-component calculation unit according to the present invention.

As shown in FIG. 22, the expense-per-component calculation unit 512b includes a blade cost calculation unit 512b-1, a hub cost calculation unit 512b-2, a low-speed shaft cost calculation unit 512b-3, a gearbox cost calculation unit 512b-4, a power generator cost calculation unit 512b-5, and a tower cost calculation unit 512b-6.

The blade cost calculation unit 512b-1 calculates the total cost by deriving the blade weight and unit price from an equation of the diameter of the turbine rotor.

The hub cost calculation unit 512b-2 calculates the cost by summing the cost of the hub structure and the cost of the base pitch mechanism and multiplying the unit price per kilogram by the weight value for each element after design.

The low-speed shaft cost calculation unit 512b-3 is configured based on the type of the drive train and the material of the shaft, and serves to calculate the cost by multiplying the material cost by the unit price per kilogram.

The gearbox cost calculation unit 512b-4 serves to calculate the cost based on the number of stages of the gearbox, the gear train type, the gearbox type, the control type, the rotational speed of the rotor, and the material used to manufacture the gearbox.

The gearbox cost calculation unit 512b-4 calculates the cost by multiplying the weight value for each element after design by the unit price per kilogram.

The power generator cost calculation unit 512b-5 is based on the correlation between the power generation type, the power generation rate, and the induction power generator correction coefficient, and serves to calculate the cost by multiplying the weight value calculated after design by the unit price per kilogram.

The tower cost calculation unit 512b-6 optimizes the diameter and thickness of the tower, calculates the weight of the tower, and then calculates the cost by multiplying the weight value for each element after design by the unit price per kilogram.

BOS Module 513

The BOS module 513 serves to estimate the production cost considering the system part and the support structure part of the new and renewable energy power generation.

Figure 23:
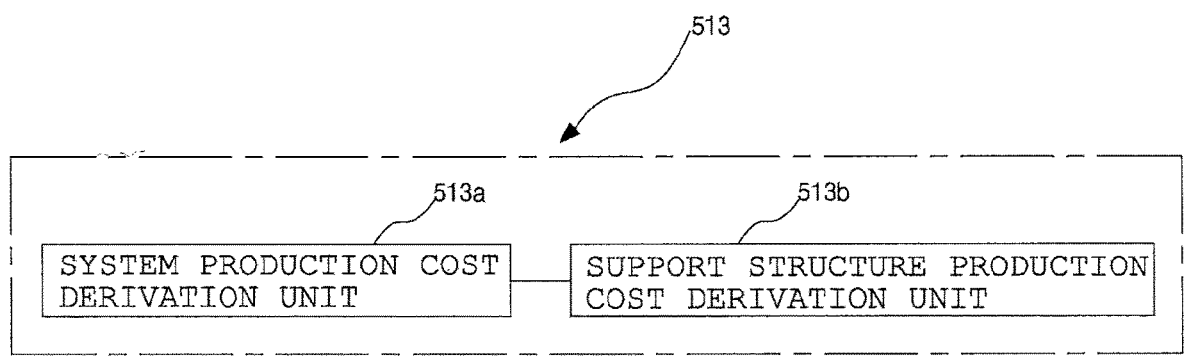
FIG. 23 is a block diagram illustrating elements of a BOS module according to the present invention.

As shown in FIG. 23, the BOS module 513 includes a system production cost derivation unit 513a and a support structure production cost derivation unit 513b.

The system production cost derivation unit 513a derives the total production cost by summing the internal/external network production cost, the production cost based on the number of substations, and the network connection cost, based on the network length and unit price according to the conditions of the new and renewable energy power generation site.

The system production cost derivation unit 513a is configured to derive the total cost by summing network connection cost, cable costs, and substation cost.

The support structure production cost derivation unit 513b calculates the weight through an equation of correlation between the water depth according to the soil type and the weight of the support structure, and derives the total cost by applying the unit price to the calculated weight.

The support structure production cost derivation unit 513b is constructed to derive the total cost by summing the support structure cost, support structure connection cost, and procurement cost.

The values input to the BOS module include the farm capacity, the farm efficiency, the distance, the depth, the foundation type, the soil type, the rotor diameter, and the unit price of each boss component (internal network, external network, substation, network connection, support structures, etc.).

The result values of the BOS module include the weight of the support structure, the BOS configuration, and the production cost of each component.

BOS T&I Module

The BOS T&I module 514 estimates the transport and installation time of each object-to-be-installed in a target farm and calculates the transport and installation cost by applying the unit price, considering that, in building an offshore wind farm, installation ships and features of each installation ship such as loading capacity, moving speed, rental unit price are determined according to the type of ship combination for each object-to-be-installed.

The values input to the BOS T&I module 514 include the type and model of an installation ship, the transfer time, the unit price of the installation ship and the weather adjustment factor for each object to be transported and installed (turbine, support structure, cable, offshore substation, score protection).

The result values of the BOS T&I module 514 include the installation time and production cost of each object to be transported and installed.

Weather adjustment factor=(Number of data values within the acceptable range/Total number of data points)*100%.

O&M Module 515

The O&M module 515 serves to estimate and calculate an operation cost and a maintenance cost of the new and renewable energy power generation.

Figure 24:
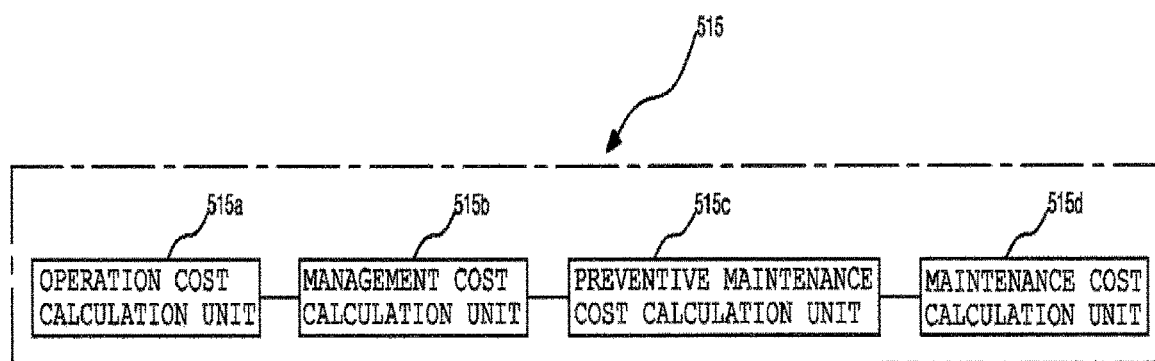
FIG. 24 is a block diagram illustrating elements of an O&M module according to the present invention.

As shown in FIG. 24, the O&M module 515 includes an operation cost calculation unit 515a, a management cost calculation unit 515b, a preventive maintenance cost calculation unit 515c, and a maintenance cost calculation unit 515d.

The operation cost calculation unit 515a serves to calculate the farm operation cost including the insurance, the lease cost, and the labor cost.

The management cost calculation unit 515b serves to calculate the management cost determined by a probability model based on the fault type and fault rate of new and renewable energy power generation, the maintenance strategy, the characteristics of the transport and lift ship and equipment, and the weather conditions.

The values input to the O&M module include the operation cost (insurance cost, lease cost, labor cost), the ship type and unit price for preventive maintenance and fault maintenance, the fault rate for each type of new and renewable energy power generation fault, repair time, labor cost/material cost, and the weather adjustment factor.

The output values of the O&M module include a preventive maintenance cost calculation unit, a maintenance cost calculation unit, and a total O&M cost.

As the operation of periodic inspection and replacement of consumables is required during the year, the preventive maintenance cost calculation unit 515c serves to estimate and calculate the annual cost by inputting manpower necessary for the operation, time, transport means and unit price, and consumption quantities and cost of consumables.

The maintenance cost calculation unit 515d divides the fault types according to the fault characteristics based on the individual rate of fault of each component and system that can occur in the offshore wind power generator during the year, calculates the cost required for repair for each fault type, and stochastically estimates and calculates the annual cost.

Financial Analysis Processor Module 516

Figure 25:
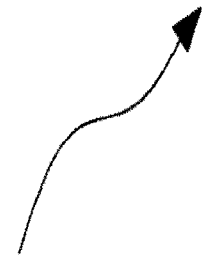
FIG. 25 is a block diagram illustrating elements of a financial analysis processor module according to the present invention.

As shown in FIG. 25, the financial analysis processor module 516 associates basic cost information necessary for analysis with other analysis modules to automatically derive the total investment cost, profit and expenditure, and estimates the cash flow during the project operation period based on the investment structure and financial conditions and calculates the project feasibility index.

The values input to the financial analysis processor module 516 include the exchange rate, the loan rate and the loan conditions, the ratio of the fishery compensation/reserve ratio, the discount rate, the interest rate, the SMP price scenario, the REC price, the tax rate and the loan fee.

The result values include Net Present Value (NPV), Internal Rate of Return (IRR), Debt-Service Coverage Ratio (DSCR) and Levelized Cost of Energy (LCOE).

Smart Business Model Economic Feasibility Analysis Control Module 517

Figure 26:
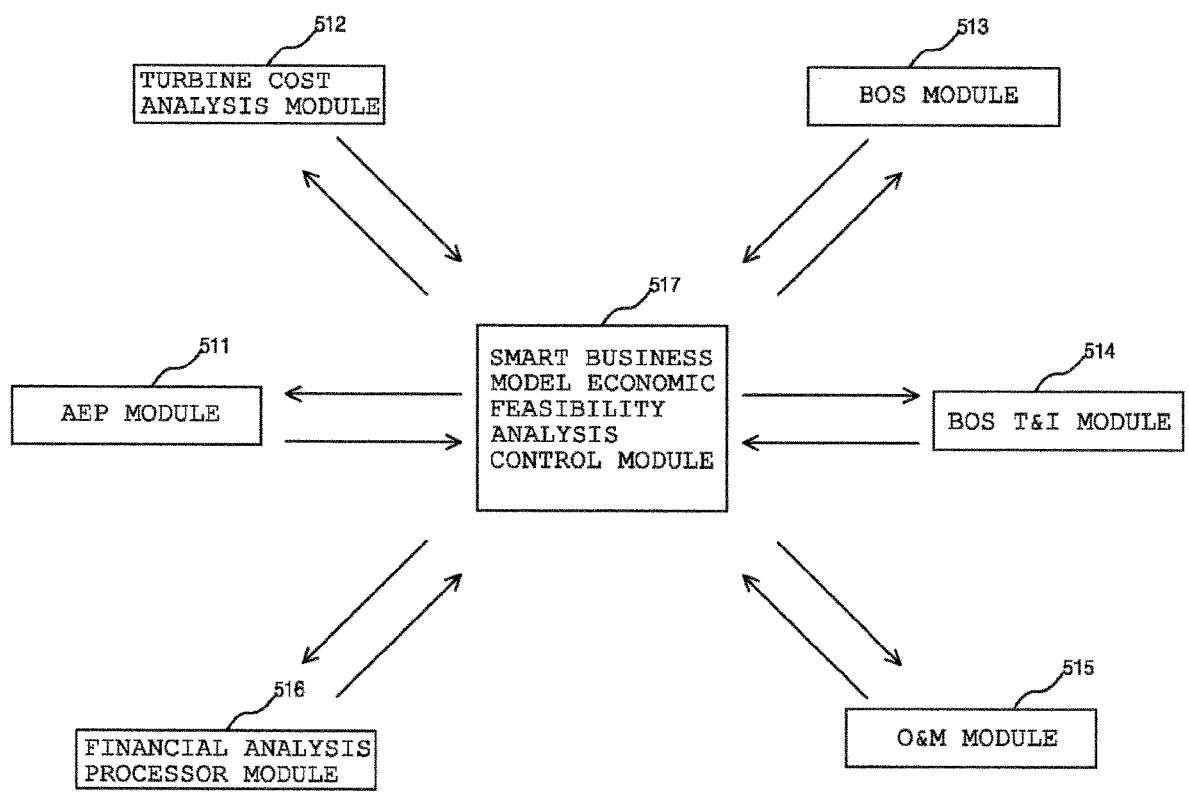
FIG. 26 is a flowchart illustrating a smart business model economic feasibility analysis control module, which is connected with the AEP module, turbine cost analysis module, BOS module, BOS T&I module, O&M module and financial analysis processor module and controlled to analyze economic feasibility of the new and renewable energy business model including estimated revenue of the new and renewable energy power generation facilities based on the result values calculated by the AEP module, turbine cost analysis module, BOS module, BOS T&I module, O&M module and financial analysis processor module and to transmit the analyzed new and renewable energy business model economic feasibility analysis data to a data transfer unit, according to an embodiment of the present invention.

As shown in FIG. 26, the smart business model economic feasibility analysis control module 517 is connected to the AEP module, the turbine cost analysis module, the BOS module, the BOS T&I module, the O&M module and the financial analysis processor module, analyzes economic feasibility of the new and renewable energy business model including an estimated revenue of the new and renewable energy power generation equipment based on the result values calculated by the AEP module, the turbine cost analysis module, the BOS module, the BOS T&I module, the O&M module and the financial analysis processor module, and controls the analyzed new and renewable energy business model economic feasibility analysis data to be transmitted to the data transfer unit.

Next, the data transfer unit 520 according to the present invention will be described.

The data transfer unit 520 transmits the economic feasibility analysis data of the new and renewable energy business model transferred from the new and renewable energy business model economic feasibility analysis simulation module to the new and renewable energy FinTech platform module.

Hereinafter, a method for encouraging participation of residents in building a new and renewable energy farm through the economic feasibility analysis of the new and renewable energy FinTech platform module will be described.

Figure 27:
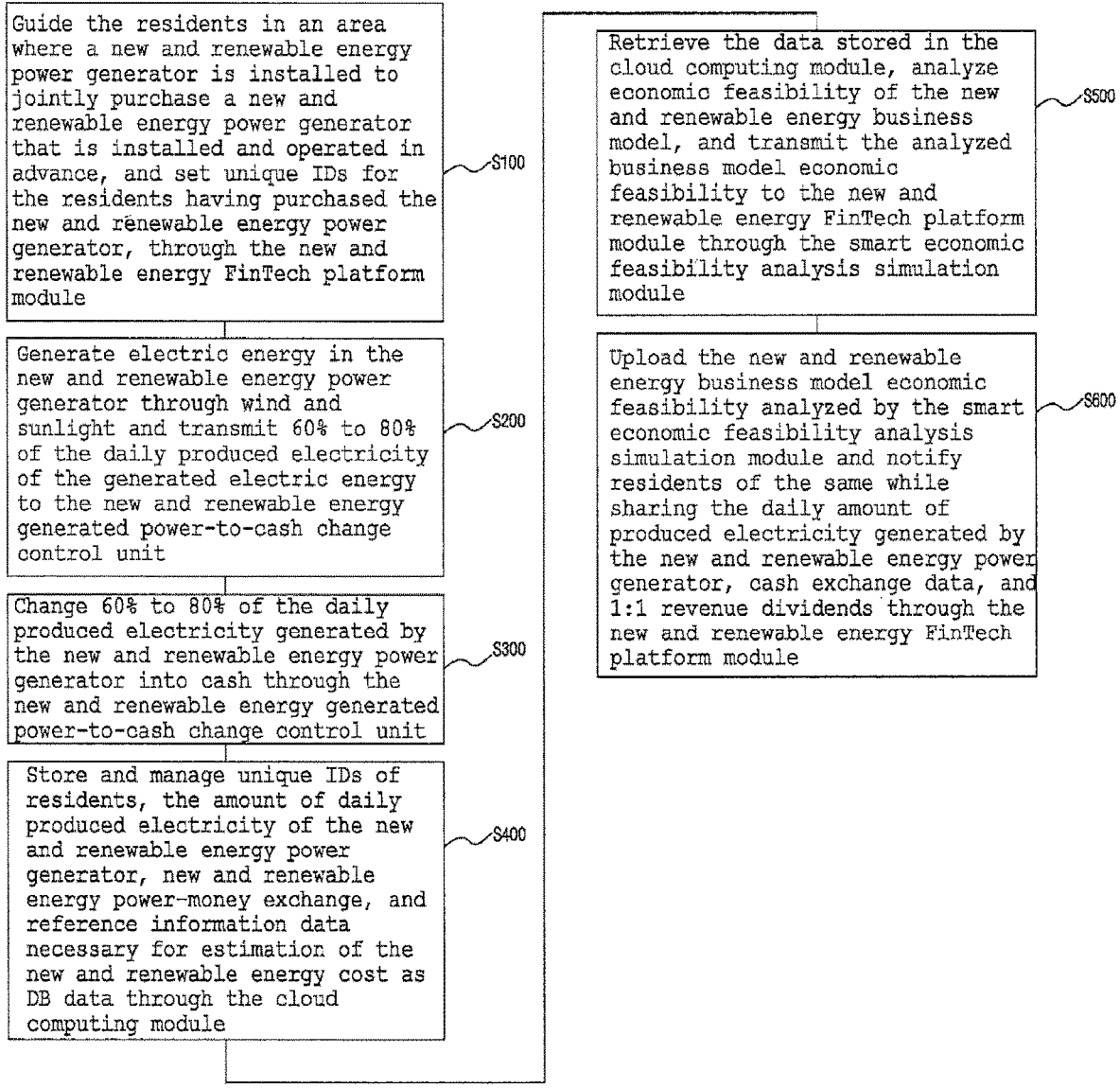
FIG. 27 is a flowchart illustrating a method for encouraging participation of residents in building a new and renewable energy farm through economic feasibility analysis with a new and renewable energy FinTech platform module according to the present invention.

First, as shown in FIG. 27, through a new and renewable energy FinTech platform module, the residents in an area where a new and renewable energy power generator is installed are guided to jointly purchase a new and renewable energy power generator that is installed and operated in advance, and unique IDs are set for the residents having purchased the new and renewable energy power generator (S100).

The resource resident application module of the new and renewable energy FinTech platform module is activated in the form of an application on the smart devices of the residents in an area where the new and renewable energy power generator is installed. Then, the resource resident application module registers information on the residents and requests FinTech API services (e.g., inquiry service, transfer service, etc.) with the FinTech enterprise management server for joint purchase of the new and renewable energy power generator and converts the FIN ACCOUNT, which is a FinTech ID code, into a disposable virtual account.

Subsequently, the FinTech enterprise management server of the new and renewable energy FinTech platform module makes a request to the FinTech open platform for registration of the residents making a joint purchase of a new and renewable energy power generator and conversion of the account numbers of the residents making the joint purchase of the new and renewable energy power generator into token accounts, and processes a financial service requested by the resource resident module.

Subsequently, the FinTech open platform of the new and renewable energy FinTech platform module creates and stores a virtual token account for one time use corresponding to the account of a resident, and transmits the generated token account value to the resource resident application module.

Then, the new and renewable energy power generator generates electric energy through wind power and sunlight and transmits 60% to 80% of the daily amount of produced electricity to the new and renewable energy generated power-to-cash change control unit (S200).

Then, the new and renewable energy generated power-to-cash change control unit changes 60% to 80% of the daily amount of electricity generated from the new and renewable energy power generator into cash, counts the participation dates of the residents participating in the power demand management project, and then notifies the new and renewable energy FinTech platform module of the cash exchange data corresponding to the daily amount of produced electricity and the profit data through participation in the power demand management project in real time (S300).

Then, the cloud computing module stores and manages unique IDs of residents, the daily amount of produced electricity of the new and renewable energy power generator, and reference information data necessary for estimation of the cost of new and renewable energy as DB data (S400).

Then, the smart economic feasibility analysis simulation module retrieves data stored in a cloud computing module, analyzes the economic feasibility of the new and renewable energy business model and the economic feasibility of the power demand management project, and then transmits the analyzed economic feasibility of the business model and economic feasibility of the power demand management project to the new and renewable energy FinTech platform module (S500).

These operations are performed in the new and renewable energy business model economic feasibility analysis simulation module 510 and the data transfer unit 520.

Specifically, as shown in FIG. 28, the new and renewable energy business model economic feasibility analysis simulation unit 510 retrieves the reference information data necessary for estimating the new and renewable energy cost as stored in the cloud computing module, estimates the cost of the new and renewable energy power generation equipment, analyzes new and renewable energy business model economic feasibility including the expected profit of the new and renewable energy power generation equipment, and then transmits the data of the analyzed new and renewable energy business model economic feasibility to the data transfer unit (S510).

Subsequently, the data transfer unit 520 transmits the economic feasibility analysis data of the new and renewable energy business model transferred from the new and renewable energy business model economic feasibility analysis simulation module to the new and renewable energy FinTech platform module (S520).

Finally, the daily amount of electricity generated by the new and renewable energy power generator, cash exchange data, and 1:1 revenue dividends are shared through the new and renewable energy FinTech platform module, and the new and renewable energy business model economic feasibility and the economic feasibility of the power demand management project (new and renewable energy power station) analyzed by the smart economic feasibility analysis simulation module are uploaded such that the residents are notified thereof (S600).

In this operation, the resource server of the new and renewable energy FinTech platform module actually processes the FinTech API service requested by the FinTech open platform and changes 60% to 80% of the daily amount of electricity generated from the new and renewable energy power generator into cash, and equally distributes the cash to the IDs set through the new and renewable energy power generation FinTech platform module, and notifies the resource resident application module of the processing result and the economic feasibility of the new and renewable energy business model analyzed by the smart economic feasibility analysis simulation module in real time.

Hereinafter, the operation of the new and renewable energy business model economic feasibility analysis simulation module 510 in the method for encouraging participation of residents in building a new and renewable energy farm through notification of economic feasibility analysis with a new and renewable energy FinTech platform module according to the present invention will be described in detail.

Specific Process of Operation (S510) of the New and Renewable Energy Business Model Economic Feasibility Analysis Simulation Module 510

Figure 29:
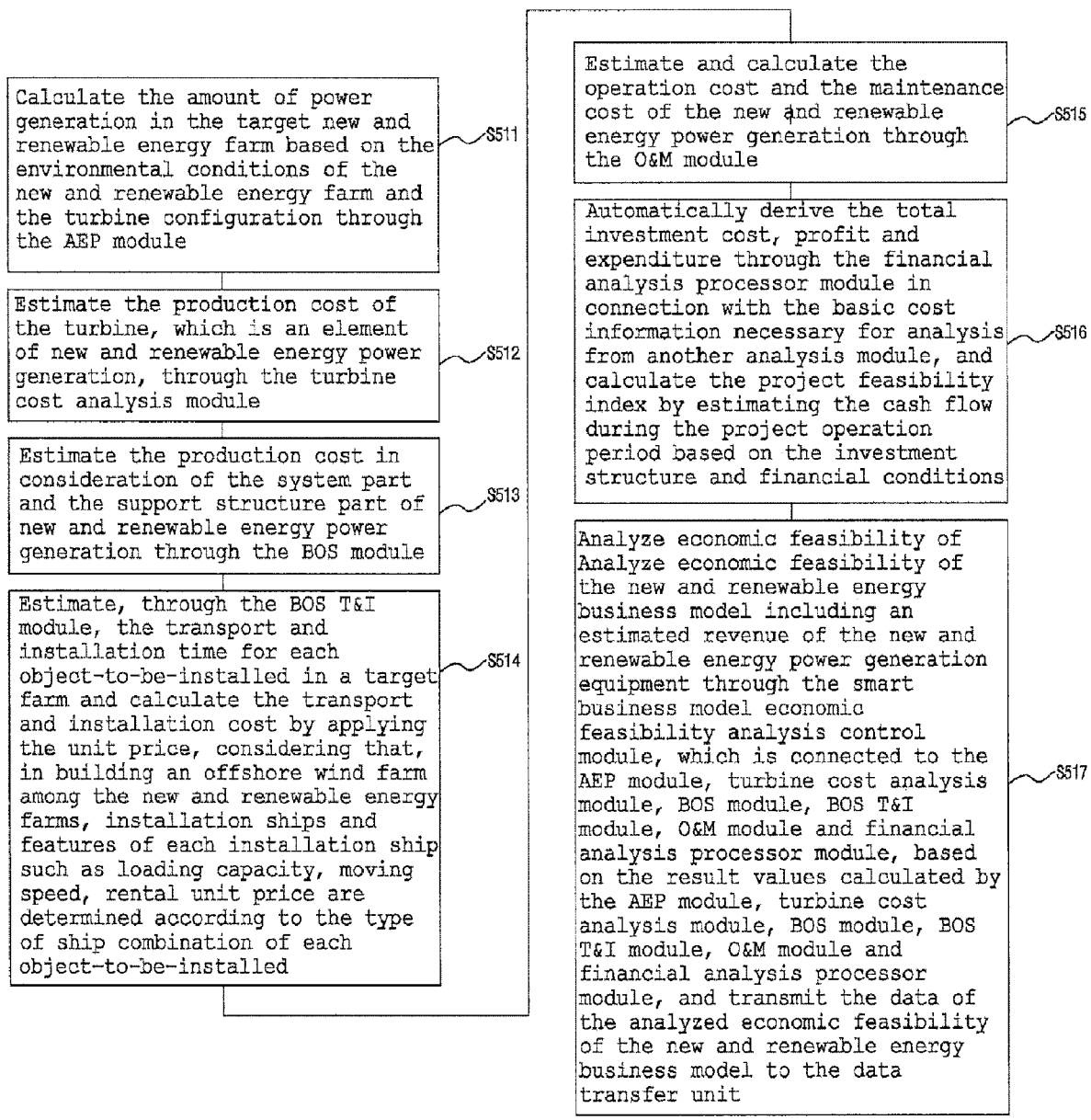
FIG. 29 is a flowchart illustrating a specific method for a simulation module for economic feasibility analysis of a new and renewable energy business model in the method for encouraging participation of residents in building a new and renewable energy farm through notification of economic feasibility analysis with a new and renewable energy FinTech platform module according to the present invention.

First, as shown in FIG. 29, the new and renewable energy business model economic feasibility analysis simulation unit 510 calculates the amount of power generation in a target new and renewable energy farm based on the environmental conditions of the new and renewable energy farm and the turbine configuration through the AEP module 511 (S511).

Subsequently, the new and renewable energy business model economic feasibility analysis simulation unit 510 estimates a production cost of the turbine, which is an element of new and renewable energy power generation through the turbine cost analysis module 512 (S512).

Subsequently, the new and renewable energy business model economic feasibility analysis simulation unit 510 estimates the production cost through the BOS module 513 considering the system part and the support structure part of the new and renewable energy power generation (S513).

Subsequently, through the BOS T&I module 514, the new and renewable energy business model economic feasibility analysis simulation unit 510 estimates the transport and installation time of each object-to-be-installed in a target farm and calculates the transport and installation cost by applying the unit price, based on the face that, in building an offshore wind farm among new and renewable energy farms, installation ships and features of each installation ship such as loading capacity, moving speed, rental unit price are determined according to the type of ship combination for each object-to-be-installed (S514).

Then, the new and renewable energy business model economic feasibility analysis simulation unit 510 estimates and calculates an operation cost and a maintenance cost of the new and renewable energy power generation through the O&M module 515 (S515).

Subsequently, through the financial analysis processor module 516, the new and renewable energy business model economic feasibility analysis simulation unit 510 associates basic cost information necessary for analysis with other analysis modules to automatically derive the total investment cost, profit and expenditure, and estimates the cash flow during the project operation period based on the investment structure and financial conditions and calculates the project feasibility index (S516).

Finally, through the smart business model economic feasibility analysis control module 517, the new and renewable energy business model economic feasibility analysis simulation unit 510 is connected to the AEP module, the turbine cost analysis module, the BOS module, the BOS T&I module, the O&M module and the financial analysis processor module, analyzes economic feasibility of the new and renewable energy business model including an estimated revenue of the new and renewable energy power generation equipment based on the result values calculated by the AEP module, the turbine cost analysis module, the BOS module, the BOS T&I module, the O&M module and financial analysis processor module, and controls the analyzed new and renewable energy business model economic feasibility analysis data to be transmitted to the data transfer unit (S517).

As is apparent from the above description, the present invention has the following effects.

First, residents in the area where new and renewable energy power generators are installed are encouraged to jointly purchase a new and renewable energy power generator that is pre-installed and operated, unique IDs are set for the residents who have purchased the new and renewable energy power generator, and then the daily amount of electricity generated from the new and renewable energy power generator, cash exchange data, and 1:1 revenue dividends can be shared. Thereby, the 1:1 revenue dividends can be deposited into the residents' own accounts, and thus the awareness that new and renewable energy is turned into money is raised. Therefore, the resident participation rate for building a new and renewable energy farm may be increased by 90% over the conventional rate.

Second, through the new and renewable energy FinTech platform module, which includes a Resource Resident App module, a FinTech enterprise management server, a FinTech open platform and a resource server, countermeasures against hacking attacks, retransmission attacks, and financial fraud, which have not been solved by the conventional financial service authentication techniques, can be provided and a one-time authentication processing method, which is an authentication method for ensuring secure financial transactions in a FinTech environment, can be provided. Thereby, confidentiality may be enhanced, and user convenience and security may be improved by 80% over the conventional cases.

Third, since the economic feasibility of the new and renewable energy business model analyzed in the smart economic analysis simulation module can be uploaded to notify the residents of the economic feasibility, benefits of power generation can be shared between the residents and the power station operator, and sharing of information about a power generation project can be facilitated. Therefore, interest of the residents in new and renewable energy may be boosted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for encouraging participation of residents in building a new and renewable energy farm through notification of economic feasibility analysis, the apparatus comprising:

a new and renewable energy FinTech platform module configured to advertise to the residents in an area where new and renewable energy power generators are installed, guide the residents to jointly purchase a new and renewable energy power generator that is installed and operated in advance, set unique IDs for the residents having purchased the new and renewable energy power generator, allow a daily amount of electricity generated by the new and renewable energy power generator, cash exchange data, and a profit through 1:1 revenue dividends to be shared by the residents, and upload economic feasibility of a new and renewable energy business model analyzed by a smart economic feasibility simulation module to notify the residents of the economic feasibility, wherein the new and renewable energy power generator is configured to generate electric energy through wind power and sunlight and transmit 60% to 80% of a daily amount of generated electricity to a new and renewable energy generated power-to-cash change control unit, and wherein the new and renewable energy generated power-to-cash change control unit is configured to change 60% to 80% of the daily amount of electricity generated from the new and renewable energy power generator into cash and notify the new and renewable energy FinTech platform module of cash exchange data corresponding to the daily amount of generated electricity in real time; and a cloud computing module configured to store and manage unique IDs of the residents, the daily amount of electricity generated by the new and renewable energy power generator, and reference information data necessary for change of new and renewable energy power into money as database (DB) data, wherein the smart economic feasibility analysis simulation module is configured to retrieve the data stored in the cloud computing module and analyze new and renewable energy business model economic feasibility and transmit the analyzed business model economic feasibility to the new and renewable energy FinTech platform module.

2. The apparatus according to claim 1, wherein the new and renewable energy FinTech platform module comprises:

a resource resident application module activated in a form of an application on smart devices of the residents in the area where the new and renewable energy power generator is installed and configured to register information on the residents and request FinTech API services including an inquiry service and a transfer service with a FinTech enterprise management server for a joint purchase of the new and renewable energy power generator and convert a FIN ACCOUNT corresponding to a FinTech ID code into a disposable virtual account;

the FinTech enterprise management server configured to make a request to a FinTech open platform for registration of the residents making the joint purchase of the new and renewable energy power generator and conversion of account numbers of the residents making the joint purchase of the new and renewable energy power generator into token accounts and process a financial service requested by the resource resident module;

the FinTech open platform configured to create and store a virtual token account for one time use corresponding to the account of a resident and transmit a value of the generated token account to the resource resident application module; and a resource server configured to process the FinTech API service requested by the FinTech open platform, change 60% to 80% of the daily amount of electricity generated from the new and renewable energy power generator into cash, equally distribute the cash to the IDs set through the new and renewable energy power generation FinTech platform module, and notify the resource resident application module of a processing result and the economic feasibility of the new and renewable energy business model analyzed by the smart economic feasibility analysis simulation module in real time.

3. The apparatus according to claim 2, wherein the FinTech enterprise management server comprises:
a resident management module configured to generate a server random value for sign up of the residents and an authentication process with the residents, provide a financial API list of the residents and manage a FinTech API list requested by the residents, deliver a FinTech API request of the residents to an authentication server and send a result of request processing to the residents;
a FIN account management module configured to manage the FIN accounts created on the FinTech open platform;
an authentication key management module configured to transmit an IP address of a resident of the residents, a Host name, and a Mac address to the FinTech open platform, create a resident ID and an authentication secret key and transmit the same together with the information registered with the FinTech open platform to the resident in order to use the FinTech API service;
an API authentication code generation module configured to generate an API authentication code for credentials of a client when the FinTech API is requested; and
an API processing module configured to notify the resource resident application module of a result of API processing received from the FinTech open platform after completion of processing of the FinTech API service for the resident.

4. The apparatus according to claim 2, wherein the FinTech open platform comprises:
a FinTech management module configured to register and process FinTech membership of the residents, request and process cooperation agreements, and request and process use of an API;
a FIN account generation module configured to convert a financial account number registered by a resident into an account for the FinTech service;
an authentication key issuance/verification module configured to generate Client_id and a key value of Client_Secret to be used by the resident after verifying the IP address, host name, and MAC address registered by a request from the resident;
a nonce generation module configured to generate a server random value for generating an API authentication code value; and an access token generation/verification module configured to generate a key value for processing the FinTech API services.

5. The apparatus according to claim 1, wherein the cloud computing module comprises:
a cloud testing unit configured to perform error and safety verification on the smart economic feasibility analysis simulation module to perform direct verification of the smart economic feasibility analysis simulation module;
a database unit connected to the new and renewable energy FinTech platform module to collect and store the unique IDs of the residents, the daily amount of electricity generated from the new and renewable energy power generator, and money corresponding to the new and renewable energy power and provide a necessary database;
a cloud data control unit configured to provide a cloud service to the smart economic feasibility analysis simulation module using cloud computing technology, persistently detect malicious code and virus related to the smart economic feasibility analysis simulation module, and store a user authentication code; and
a cloud SDK (Software Development Kit) unit configured to build a development environment for the smart economic feasibility analysis simulation module according to a user's intention, and create a smart economic feasibility analysis simulation module through editing and correction, update the smart economic feasibility analysis simulation module with the created smart economic feasibility analysis simulation module through overriding.

6. The apparatus according to claim 1, wherein the smart economic feasibility analysis simulation module comprises:
a new and renewable energy business model economic feasibility analysis simulation unit configured to retrieve the reference information data necessary for estimating a new and renewable energy cost as stored in the cloud computing module, estimate a cost of new and renewable energy power generation equipment, analyze the new and renewable energy business model economic feasibility including an expected profit of the new and renewable energy power generation equipment, and transmit data of the analyzed new and renewable energy business model economic feasibility to a data transfer unit,
wherein the data transfer unit is configured to transmit the economic feasibility analysis data of the new and renewable energy business model transferred from the economic feasibility analysis simulation unit of the new and renewable energy business model to the new and renewable energy FinTech platform module.

7. The apparatus according to claim 6, wherein the new and renewable energy business model economic feasibility analysis simulation module comprises:
an annual energy production (AEP) module configured to calculate an amount of power generation in a target new and renewable energy farm based on environmental conditions of the new and renewable energy farm and turbine configuration;
a turbine cost analysis module configured to estimate a production cost of a turbine corresponding to an element of new and renewable energy power generation;
a BOS module configured to estimate a production cost considering a system part and a support structure part of the new and renewable energy power generation;
a BOS T&I module configured to estimate a transport and installation time of each object-to-be-installed in the target farm and calculate a transport and installation cost by applying a unit price, considering that, in building an offshore wind farm among new and renewable energy farms, installation ships and features of each installation ship including loading capacity, moving speed, rental unit price are determined according to a type of ship combination for each object-to-be-installed;

an O&M module configured to estimate and calculate an operation cost and a maintenance cost of the new and renewable energy power generation;

a financial analysis processor module configured to associate a basic cost information necessary for analysis with other analysis modules to automatically derive a total investment cost, profit and expenditure, estimate a cash flow during a project operation period based on an investment structure and financial conditions and calculate a project feasibility index;

a smart business model economic feasibility analysis control module connected to the AEP module, the turbine cost analysis module, the BOS module, the BOS T&I module, the O&M module and the financial analysis processor module, analyze economic feasibility of the new and renewable energy business model including an estimated revenue of the new and renewable energy power generation equipment based on result values calculated by the AEP module, the turbine cost analysis module, the BOS module, the BOS T&I module, the O&M module and the financial analysis processor module, and control the analyzed new and renewable energy business model economic feasibility analysis data to be transmitted to the data transfer unit.

8. An apparatus for encouraging participation of residents in building a new and renewable energy farm through notification of economic feasibility analysis, the apparatus comprising:

a new and renewable energy FinTech platform module configured to advertise to the residents in an area where new and renewable energy power generators are installed, guide the residents to jointly purchase a new and renewable energy power generator that is installed and operated in advance, set unique IDs for the residents having purchased the new and renewable energy power generator, allow a daily amount of electricity generated by the new and renewable energy power generator, cash exchange data, and a profit through 1:1 revenue dividends to be shared by the residents, and upload economic feasibility of a new and renewable energy business model analyzed by the smart economic feasibility simulation module to notify the residents of the economic feasibility;

the new and renewable energy power generator configured to generate electric energy through wind power and sunlight and transmit 60% to 80% of a daily amount of generated electricity to a new and renewable energy generated power-to-cash change control unit;

the new and renewable energy generated power-to-cash change control unit configured to change 60% to 80% of the daily amount of electricity generated from the new and renewable energy power generator into cash and notify the new and renewable energy FinTech platform module of cash exchange data corresponding to the daily amount of generated electricity in real time;

a cloud computing module configured to store and manage the unique IDs of the residents, the daily amount of electricity generated by the new and renewable energy power generator, and reference information data necessary for change of new and renewable energy power into money as database (DB) data; and a smart economic feasibility analysis simulation module configured to retrieve the data stored in the cloud computing module and analyze new and renewable energy business model economic feasibility and transmit the analyzed business model economic feasibility to the new and renewable energy FinTech platform module, wherein the new and renewable energy FinTech platform module comprises:

a resource resident application module activated in a form of an application on smart devices of the residents in the area where the new and renewable energy power generator is installed and configured to register information on the residents and request FinTech API services including an inquiry service and a transfer service with a FinTech enterprise management server for a joint purchase of the new and renewable energy power generator and convert a FIN account corresponding to a FinTech ID code into a disposable virtual account;

the FinTech enterprise management server configured to make a request to a FinTech open platform for registration of the residents making the joint purchase of the new and renewable energy power generator and conversion of account numbers of the residents making the joint purchase of the new and renewable energy power generator into token accounts and process a financial service requested by the resource resident module;

the FinTech open platform configured to create and store a virtual token account for one time use corresponding to the account of a resident and transmit a value of the generated token account to the resource resident application module; and a resource server configured to process the FinTech API service requested by the FinTech open platform, change 60% to 80% of the daily amount of electricity generated from the new and renewable energy power generator into cash, equally distribute the cash to the IDs set through the new and renewable energy power generation FinTech platform module, and notify the resource resident application module of a processing result and the economic feasibility of the new and renewable energy business model analyzed by the smart economic feasibility analysis simulation module in real time, and the cloud computing module comprises:

a cloud testing unit configured to perform error and safety verification on the smart economic feasibility analysis simulation module to perform direct verification of the smart economic feasibility analysis simulation module;

a database unit connected to the new and renewable energy FinTech platform module to collect and store the unique IDs of the residents, the daily amount of electricity generated from the new and renewable energy power generator, and money corresponding to the new and renewable energy power and provide a necessary database;

a cloud data control unit configured to provide a cloud service to the smart economic feasibility analysis simulation module using cloud computing technology, persistently detect malicious code and virus related to the smart economic feasibility analysis simulation module, and store a user authentication code; and a cloud SDK (Software Development Kit) unit configured to build a development environment for the smart economic feasibility analysis simulation module according to a user's intention, and create a smart economic feasibility analysis simulation module through editing and correction, update the smart economic feasibility analysis simulation module with the created smart economic feasibility analysis simulation module through overriding.

9. A method for encouraging participation of residents in building a new and renewable energy farm through notification of economic feasibility analysis, the method comprising:
- a step (S100) of guiding the residents in an area where a new and renewable energy power generator is installed so as to jointly purchase the new and renewable energy power generator that is installed and operated in advance and setting unique IDs for the residents having purchased the new and renewable energy power generator, through a new and renewable energy FinTech platform module;
- a step (S200) of, by the new and renewable energy power generator, generating electric energy through wind power and sunlight and transmitting 60% to 80% of a daily amount of generated electricity to a new and renewable energy generated power-to-cash change control unit;
- a step (S300) of, by the new and renewable energy generated power-to-cash change control unit, changing 60% to 80% of the daily amount of electricity generated from the new and renewable energy power generator into cash and notifying the new and renewable energy FinTech platform module of cash exchange data corresponding to the daily amount of generated electricity;
- a step (S400) of storing and managing unique IDs of residents, the daily amount of generated electricity of the new and renewable energy power generator, and reference information data necessary for estimation of a cost of new and renewable energy as database (DB) data through a cloud computing module;
- a step (S500) of, by a smart economic feasibility analysis simulation module, retrieving the data stored in the cloud computing module, analyzing economic feasibility of a new and renewable energy business model, and transmitting the analyzed business model economic feasibility to the new and renewable energy FinTech platform module; and
- a step (S600) of, by the new and renewable energy FinTech platform module, uploading the new and renewable energy business model economic feasibility analyzed by the smart economic feasibility analysis simulation module and notifying residents of the same while sharing the daily amount of electricity generated by the new and renewable energy power generator, cash exchange data, and a profit through 1:1 revenue dividends.

10. The method according to claim 9, wherein the step (S500) of retrieving the data stored in the cloud computing module, analyzing the economic feasibility of the new and renewable energy business model, and transmitting the analyzed business model economic feasibility to the new and renewable energy FinTech platform module comprises:
- a step (S510) of retrieving the reference information data necessary for estimation of a cost of new and renewable energy stored in the cloud computing module, estimating a cost of new and renewable energy power generation equipment, analyzing the economic feasibility of the new and renewable energy business model including an expected profit of the new and renewable energy power generation equipment, and transmitting data of the analyzed feasibility analysis of the new and renewable energy business model to a data transfer unit through a new and renewable energy business model economic feasibility analysis simulation module; and
- a step (S520) of transmitting the data of the analyzed feasibility analysis of the new and renewable energy business model received from the new and renewable energy business model economic feasibility analysis simulation module to the new and renewable energy FinTech platform module through the data transfer unit.

11. The method according to claim 10, wherein the step (S510) comprises:
- a step (S511) of calculating the amount of power generation in a target new and renewable energy farm based on environmental conditions of the new and renewable energy farm and turbine configuration through an annual energy production (AEP) module;
- a step (S512) of estimating a production cost of a turbine corresponding to an element of new and renewable energy power generation, through a turbine cost analysis module;
- a step (S513) of estimating a production cost in consideration of a system part and a support structure part of the new and renewable energy power generation through a BOS module;
- a step (S514) of estimating, through a BOS T&I module, a transport and installation time for each object-to-be-installed in the target farm and calculating a transport and installation cost by applying a unit price, considering that, in building an offshore wind farm among new and renewable energy farms, installation ships and features of each installation ship including loading capacity, moving speed, rental unit price are determined according to a type of ship combination of each object-to-be-installed;
- a step (S515) of estimating and calculating an operation cost and a maintenance cost of the new and renewable energy power generation through an O&M module;
- a step (S516) of automatically deriving a total investment cost, profit and expenditure through a financial analysis processor module in connection with basic cost information necessary for analysis from other analysis modules, estimating a cash flow during a project operation period based on an investment structure and financial conditions and calculating a project feasibility index;
- a step (S517) of analyzing the economic feasibility of the new and renewable energy business model including an estimated revenue of the new and renewable energy power generation equipment through a smart business model economic feasibility analysis control module connected to the AEP module, the turbine cost analysis module, the BOS module, the BOS T&I module, the O&M module and the financial analysis processor module, based on result values calculated by the AEP module, turbine cost analysis module, the BOS module, the BOS T&I module, the O&M module and the financial analysis processor module, and transmitting the data of the analyzed economic feasibility of the new and renewable energy business model to the data transfer unit.

* * * * *